US007924728B2

(12) United States Patent
Riga et al.

(10) Patent No.: US 7,924,728 B2

(45) Date of Patent: Apr. 12, 2011

(54) SYSTEMS AND METHODS FOR ENERGY-CONSCIOUS COMMUNICATION IN WIRELESS AD-HOC NETWORKS

(75) Inventors: Niky Riga, Allston, MA (US); Abraham I. Matta, Wayland, MA (US); Alberto Antonio Medina, Arlington, MA (US); Craig Partridge, East Lansing, MI (US); Jason Keith Redi, Belmont, MA (US); Isidro Marcos Castineyra, Somerville, MA (US)

(73) Assignee: Raytheon BBN Technologies Corp, Cambridge, MA (US)

( * ) Notice: Subject to any disclaimer, the term of this patent is extended or adjusted under 35 U.S.C. 154(b) by 866 days.

(21) Appl. No.: 11/895,608

(22) Filed: Aug. 24, 2007

(65) Prior Publication Data

US 2008/0049620 A1 Feb. 28, 2008

Related U.S. Application Data

(60) Provisional application No. 60/840,417, filed on Aug. 25, 2006.

(51) Int. Cl.

| | |
|---|---|
| ***H04W 52/26*** | (2009.01) |
| ***H04W 52/48*** | (2009.01) |
| ***H04L 12/56*** | (2006.01) |

(52) U.S. Cl. ........ 370/238; 370/218; 370/221; 370/329; 370/352; 370/403; 709/220; 709/225; 709/235; 709/238; 455/1; 455/7; 455/15; 455/73

(58) Field of Classification Search .......... 370/203–503; 709/235; 455/455, 7, 11, 1, 15, 73

See application file for complete search history.

(56) References Cited

U.S. PATENT DOCUMENTS

| | | | |
|---|---|---|---|
| 4,964,121 | A | 10/1990 | Moore |
| 5,128,938 | A | 7/1992 | Borras |
| 5,203,020 | A | 4/1993 | Sato et al. |
| 5,301,225 | A | 4/1994 | Suzuki et al. |
| 5,418,539 | A | 5/1995 | Sezai et al. |
| 5,430,731 | A | 7/1995 | Umemoto et al. |
| 5,583,866 | A | 12/1996 | Vook et al. |
| 5,590,396 | A | 12/1996 | Henry |
| 5,710,975 | A | 1/1998 | Bernhardt et al. |
| 5,790,946 | A | 8/1998 | Rotzoll |
| 5,987,024 | A | 11/1999 | Duch et al. |
| 6,016,322 | A | 1/2000 | Goldman |
| 6,028,853 | A | 2/2000 | Haartsen |
| 6,052,779 | A | 4/2000 | Jackson et al. |
| 6,058,106 | A | 5/2000 | Cudak et al. |
| 6,097,957 | A | 8/2000 | Bonta et al. |
| 6,104,708 | A | 8/2000 | Bergamo |
| 6,118,769 | A | 9/2000 | Pries et al. |

(Continued)

OTHER PUBLICATIONS

Office Action dated Dec. 23, 2009, U.S. Appl. No. 11/439,320.

(Continued)

*Primary Examiner* — Salman Ahmed
*Assistant Examiner* — Venkatesh Haliyur
(74) *Attorney, Agent, or Firm* — Ropes & Gray LLP

(57) ABSTRACT

The invention relates to a transport protocol and associated methods and stack architectures for improving the energy efficiency of transmitting packets through an ad hoc network. The protocol controls transmissions by taking into account per-packet energy limits, per-node loss tolerances, and/or minimum availability rates determined based on path quality measurements collected by packets traversing the network and application reliability requirements associated with various applications.

6 Claims, 10 Drawing Sheets

400

404 Receive a packet at an intermediate node

406 Compute a success probability q for transmitting the packet to the next hop from the intermediate node 408 Is the link loss possibility p less than or equal to 1-q ?

No → 412 Transmission attempts = log (1-q)/log (p)

Yes → 410 Transmission attempt = 1

414 Adjust a loss tolerance of the packet to account for executed transmission attempts

U.S. PATENT DOCUMENTS

| Number | Kind | Date | Inventor | Class |
|---|---|---|---|---|
| 6,127,679 | A | 10/2000 | Elliott et al. | |
| 6,130,881 | A | 10/2000 | Stiller et al. | |
| 6,188,911 | B1 | 2/2001 | Wallentin et al. | |
| 6,192,230 | B1 | 2/2001 | van Bokhorst et al. | |
| 6,208,247 | B1 | 3/2001 | Agre et al. | |
| 6,243,579 | B1 | 6/2001 | Kari et al. | |
| 6,262,684 | B1 | 7/2001 | Stewart et al. | |
| 6,292,508 | B1 | 9/2001 | Hong et al. | |
| 6,304,215 | B1 | 10/2001 | Proctor, Jr. et al. | |
| 6,359,901 | B1 | 3/2002 | Todd et al. | |
| 6,374,311 | B1 | 4/2002 | Mahany et al. | |
| 6,377,211 | B1 | 4/2002 | Hsiung | |
| 6,381,467 | B1 | 4/2002 | Hill et al. | |
| 6,400,317 | B2 | 6/2002 | Rouphael et al. | |
| 6,404,386 | B1 | 6/2002 | Proctor, Jr. et al. | |
| 6,414,955 | B1 | 7/2002 | Clare et al. | |
| 6,418,148 | B1 * | 7/2002 | Kumar et al. | 370/468 |
| 6,463,307 | B1 | 10/2002 | Larsson et al. | |
| 6,473,607 | B1 | 10/2002 | Shohara et al. | |
| 6,476,773 | B2 | 11/2002 | Palmer et al. | |
| 6,477,361 | B1 | 11/2002 | LaGrotta et al. | |
| 6,490,461 | B1 | 12/2002 | Muller et al. | |
| 6,498,939 | B1 | 12/2002 | Thomas et al. | |
| 6,512,935 | B1 | 1/2003 | Redi | |
| 6,564,074 | B2 | 5/2003 | Romans et al. | |
| 6,574,269 | B1 | 6/2003 | Bergamo | |
| 6,583,675 | B2 | 6/2003 | Gomez | |
| 6,583,685 | B1 | 6/2003 | Easter et al. | |
| 6,590,889 | B1 | 7/2003 | Preuss et al. | |
| 6,598,034 | B1 | 7/2003 | Kloth | |
| 6,601,093 | B1 | 7/2003 | Peters | |
| 6,611,231 | B2 | 8/2003 | Crilly, Jr. et al. | |
| 6,611,233 | B2 | 8/2003 | Kimura | |
| 6,671,525 | B2 | 12/2003 | Allen et al. | |
| 6,694,149 | B1 | 2/2004 | Ady et al. | |
| 6,714,983 | B1 | 3/2004 | Koenck et al. | |
| 6,721,275 | B1 * | 4/2004 | Rodeheffer et al. | 370/238 |
| 6,735,178 | B1 | 5/2004 | Srivastava et al. | |
| 6,735,630 | B1 * | 5/2004 | Gelvin et al. | 709/224 |
| 6,745,027 | B2 | 6/2004 | Twitchell, Jr. | |
| 6,757,248 | B1 * | 6/2004 | Li et al. | 370/235 |
| 6,760,584 | B2 | 7/2004 | Jou | |
| 6,791,949 | B1 | 9/2004 | Ryu et al. | |
| 6,804,208 | B2 | 10/2004 | Cain et al. | |
| 6,816,115 | B1 | 11/2004 | Redi et al. | |
| 6,859,135 | B1 | 2/2005 | Elliott | |
| 6,888,819 | B1 | 5/2005 | Mushkin et al. | |
| 6,894,975 | B1 | 5/2005 | Partyka | |
| 6,894,991 | B2 * | 5/2005 | Ayyagari et al. | 370/325 |
| 6,920,123 | B1 | 7/2005 | Shin et al. | |
| 6,973,039 | B2 * | 12/2005 | Redi et al. | 370/238 |
| 6,981,052 | B1 | 12/2005 | Cheriton | |
| 6,990,075 | B2 * | 1/2006 | Krishnamurthy et al. | 370/236 |
| 7,020,501 | B1 | 3/2006 | Elliott et al. | |
| 7,020,701 | B1 * | 3/2006 | Gelvin et al. | 709/224 |
| 7,027,392 | B2 | 4/2006 | Holtzman et al. | |
| 7,046,639 | B2 | 5/2006 | Garcia-Luna-Aceves et al. | |
| 7,058,031 | B2 | 6/2006 | Bender et al. | |
| 7,072,432 | B2 | 7/2006 | Belcea | |
| 7,088,678 | B1 | 8/2006 | Freed et al. | |
| 7,103,344 | B2 | 9/2006 | Menard | |
| 7,110,783 | B2 | 9/2006 | Bahl et al. | |
| 7,133,398 | B2 | 11/2006 | Allen et al. | |
| 7,142,520 | B1 | 11/2006 | Haverinen et al. | |
| 7,142,864 | B2 * | 11/2006 | Laroia et al. | 455/450 |
| 7,151,945 | B2 | 12/2006 | Myles et al. | |
| 7,155,263 | B1 | 12/2006 | Bergamo | |
| 7,165,102 | B2 * | 1/2007 | Shah et al. | 709/223 |
| 7,184,413 | B2 | 2/2007 | Beyer et al. | |
| 7,209,771 | B2 | 4/2007 | Twitchell, Jr. | |
| 7,218,630 | B1 * | 5/2007 | Rahman | 370/355 |
| 7,286,844 | B1 | 10/2007 | Redi et al. | |
| 7,330,736 | B2 | 2/2008 | Redi | |
| 7,342,876 | B2 * | 3/2008 | Bellur et al. | 370/221 |
| 7,346,679 | B2 * | 3/2008 | Padmanabhan et al. | 709/224 |
| 7,363,371 | B2 * | 4/2008 | Kirkby et al. | 709/225 |
| 7,369,512 | B1 | 5/2008 | Shurbanov et al. | |
| 7,376,827 | B1 * | 5/2008 | Jiao | 713/153 |
| 7,388,847 | B2 * | 6/2008 | Dubuc et al. | 370/329 |
| 7,466,655 | B1 | 12/2008 | Zhao | |
| 7,523,220 | B2 | 4/2009 | Tan et al. | |
| 7,542,437 | B1 * | 6/2009 | Redi et al. | 370/311 |
| 7,583,654 | B2 | 9/2009 | Zumsteg | |
| 7,599,443 | B2 * | 10/2009 | Ionescu et al. | 375/267 |
| 7,664,055 | B2 | 2/2010 | Nelson | |
| 7,668,127 | B2 | 2/2010 | Krishnamurthy et al. | |
| 7,688,772 | B2 | 3/2010 | Sinivaara et al. | |
| 7,719,989 | B2 * | 5/2010 | Yau | 370/248 |
| 7,742,399 | B2 * | 6/2010 | Pun | 370/218 |
| 7,764,617 | B2 | 7/2010 | Cain et al. | |
| 2002/0067736 | A1 | 6/2002 | Garcia-Luna-Aceves et al. | |
| 2002/0071395 | A1 * | 6/2002 | Redi et al. | 370/252 |
| 2002/0145978 | A1 | 10/2002 | Batsell et al. | |
| 2002/0146985 | A1 | 10/2002 | Naden | |
| 2002/0147816 | A1 | 10/2002 | Hlasny | |
| 2002/0186167 | A1 | 12/2002 | Anderson | |
| 2003/0037167 | A1 | 2/2003 | Garcia-Luna-Aceves et al. | |
| 2003/0066090 | A1 | 4/2003 | Traw et al. | |
| 2003/0067892 | A1 | 4/2003 | Beyer et al. | |
| 2003/0099210 | A1 | 5/2003 | O'Toole et al. | |
| 2003/0114204 | A1 | 6/2003 | Allen et al. | |
| 2003/0115369 | A1 * | 6/2003 | Walter et al. | 709/253 |
| 2003/0119568 | A1 | 6/2003 | Menard | |
| 2003/0152110 | A1 | 8/2003 | Rune | |
| 2003/0179742 | A1 * | 9/2003 | Ogier et al. | 370/351 |
| 2003/1979742 | | 9/2003 | Ogier et al. | |
| 2003/0185170 | A1 | 10/2003 | Allen et al. | |
| 2003/0202490 | A1 | 10/2003 | Gunnarsson et al. | |
| 2003/0222819 | A1 | 12/2003 | Karr et al. | |
| 2004/0077353 | A1 | 4/2004 | Mahany | |
| 2004/0125773 | A1 | 7/2004 | Wilson et al. | |
| 2004/0176023 | A1 * | 9/2004 | Linder et al. | 455/3.01 |
| 2004/0218580 | A1 * | 11/2004 | Bahl et al. | 370/350 |
| 2004/0230638 | A1 | 11/2004 | Balachandran et al. | |
| 2005/0009578 | A1 | 1/2005 | Liu | |
| 2005/0059347 | A1 | 3/2005 | Haartsen | |
| 2005/0124313 | A1 | 6/2005 | Simpson et al. | |
| 2005/0134403 | A1 | 6/2005 | Kajiya | |
| 2005/0135379 | A1 | 6/2005 | Callaway et al. | |
| 2005/0152329 | A1 | 7/2005 | Krishnan et al. | |
| 2005/0176468 | A1 | 8/2005 | Iacono et al. | |
| 2005/0185632 | A1 | 8/2005 | Draves, Jr. et al. | |
| 2005/0207376 | A1 | 9/2005 | Ashwood-Smith | |
| 2005/0215196 | A1 | 9/2005 | Krishnan et al. | |
| 2005/0215280 | A1 | 9/2005 | Twitchell, Jr. | |
| 2006/0007865 | A1 | 1/2006 | White et al. | |
| 2006/0010249 | A1 | 1/2006 | Sabesan et al. | |
| 2006/0013160 | A1 | 1/2006 | Haartsen | |
| 2006/0047807 | A1 * | 3/2006 | Magnaghi et al. | 709/224 |
| 2006/0058102 | A1 | 3/2006 | Nguyen et al. | |
| 2006/0068837 | A1 | 3/2006 | Malone | |
| 2006/0107081 | A1 | 5/2006 | Krantz et al. | |
| 2006/0126514 | A1 | 6/2006 | Lee et al. | |
| 2006/0135145 | A1 | 6/2006 | Redi | |
| 2006/0215583 | A1 | 9/2006 | Castagnoli | |
| 2006/0227724 | A1 | 10/2006 | Thubert et al. | |
| 2006/0229083 | A1 | 10/2006 | Redi | |
| 2007/0070983 | A1 | 3/2007 | Redi et al. | |
| 2007/0110000 | A1 * | 5/2007 | Abedi | 370/332 |
| 2007/0149204 | A1 | 6/2007 | Redi et al. | |
| 2007/0153731 | A1 * | 7/2007 | Fine | 370/329 |
| 2008/0232258 | A1 | 9/2008 | Larsson et al. | |
| 2008/0232344 | A1 | 9/2008 | Basu et al. | |
| 2009/0103461 | A1 | 4/2009 | Tan et al. | |
| 2009/0129316 | A1 | 5/2009 | Ramanathan et al. | |
| 2009/0161641 | A1 | 6/2009 | Kim | |

OTHER PUBLICATIONS

Clare et al, "Self-Organizing Distributed Sensor Networks," Rockwell Science Center, Electrical Engineering Department, Univ. of California Los Angeles; 9 pages.

Doherty, "Algorithms for Position and Data Recovery in Wireless Sensor Networks," Department of Electrical Engineering and Computer Sciences, Univ. of California at Berkeley; 54 pages.

Florens, C. et al. "Scheduling Algorithms for Wireless Ad-Hoc Sensor Networks", Global Telecommunications Conference, 2002.

Globecom '02 IEEE. vol. 1., pp. 6-10 (2002).
Huang, Z. et al., "A Busy-Tone Based Directional MAC Protocol for Ad Hoc Networks", MILCOM 2002. Proceedings. IEEE, vol. 2. pp. 1233-1238 (2002).
Huang, Z. et al., "A Comparison Study of Omnidirectional and Directional MAC Protocols for Ad Hoc Networks". Global Telecommunications Conference, GLOBECOM '02. IEEE, vol. 1, p. 57 (2002).
Ko, Y.B. et al., "Medium Access Control Protocols Using Directional Antennas in Ad Hoc Networks", INFOCOM 19th Annual Joint Conference of the IEEE Computer and Communications Societies, IEEE, vol. 1:13 (2000).
Liu et al, "Simulation Modeling of Large-Scale Ad-hoc Sensor Networks," European Simulation Interoperability Workshop, Univ. of Westminster, London; 12 pages, Jun. 25-27.
Mauve, M. et al. A Survey on Position-Based Routing in Mobile Ad Hoc Networks. Network, IEEE. 15:6, 30-9 (2001).
Nasipuri, A. et al. A MAC Protocol for Mobile Ad Hoc Networks Using Directional Antennas. Wireless Communications and Networking Conference 2000. WCNC. 2000 IEEE, 3:1214-19. (2000).
Rowson et al, "Everyday Problems and Always-On Radios," Berkeley Wireless Research Cetner, 11 pages.
Shah, "Energy Aware Routing for PicoRadio," Berkeley Wireless Research Center, 39 pages.
Swaneck, "Integrating Passive RF Technology with Cryptographic Communications Protocols," Microchip Technology Inc., 7 pages (2000).
Van Dyck et al, "Distributed Sensor Processing Over an Ad Hoc Wireless Network: Simulation Framework and Performance Criteria," Wireless Communications Technologies Group, National Institute of Standards and Technology, Gaithersburg, Maryland, 5 pages.
XE-1218—Single Chip Receiver; XEMICS; 8 pages (2001).
Office Action dated Dec. 10, 2008, U.S. Appl. No. 11/439,320.
Office Action dated Dec. 9, 2008, U.S. Appl. No. 11/347,963.
Tjoa R et al: "Clock drift reduction for relative time slot TDMA-based sensor networks" (Sep. 5, 2004) PIMRC 2004, IEEE, pp. 1042-1047.
Dai H et al: "Tsync: A Lightweight Bidirectional Time Synchronization Service for Wireless Sensor Networks" (Jan. 2004), Mobile Computing and Communications Review, ACM, NY, pp. 125-139, ISSN: 1091-1669.
Ebner A et al: "Decentralized slot synchronization in highly dynamic ad hoc networks" Wireless Personal Mutlimedia Communications, 2002, IEEE, vol. 2, (Oct. 27, 2002).
Zhijun Shang et al: "A low overhead multi-hop time sync protocol for wireless sensor networks" Networking, Sensing and Control, 2005, IEEE (Mar. 19, 2005), pp. 54-59.
Singh S et al "Power-Aware Routing in Mobile Ad Hoc Networks" Mobicom '98, Proceedings of the 4th Annual ACM/IEEE International Conference on Mobile Computing and Networking, Dallas, TX (Oct. 25-30, 1998) XP000850267, pp. 181-190.
Fan Ye et al "A randomized energy-conservation protocol for resilient sensor networks*" Wireless Networks; The Journal of Mobile Communication, Computation and Information, Kluwer Academic Publishers, Do, vol. 12, No. 5, (Apr. 27, 2006) pp. 637-652.
Office Action dated Apr. 3, 2008, U.S. Appl. No. 10/786,288.
Office Action dated Aug. 26, 2009, U.S. Appl. No. 11/439,320.
Office Action dated Sep. 16, 2009, U.S. Appl. No. 11/347,963.
U.S. Appl. No. 10/786,288, Elliott.
U.S. Appl. No. 10/677,945, Redi.
U.S. Appl. No. 11/895,608, Riga et al.
Hong et al. "Scalable Routing Protocols for Mobile Ad Hoc Networks," IEEE Network; pp. 11-21. (Jul./Aug. 2002).
Lang, "A Comprehensive Overview about Selected Ad Hoc Networking Routing Protocols," (2003).
Halvardsson et al, "Reliable Group Communication in a Military Mobile Ad Hoc Network, " Vaxjo Univeristy School of Mathematics and Systems Engineering, Report # 04006, pp. 1-52 (2004).
Wieselthier et al, "On the Construction of Energy-Efficient Broadcast and Multicast Tress in Wireless Networks, "IEE Infocom 2000, p. 585-594 (2000).
Ruppe et al, "Near Term Digital Radio (NTDR) System," IE, pp. 1282-1287 (1997).
Ogier et al, "Topology Dissemination Based on Reverse-Path Forwarding (TBRPF)," Sunsite.dk, Technical Memo, RFC 3684, The Internet Society), pp. 1-49 (2004.
Clausen, et al, "Optimized Link State Routing Protocol (OLSR)," Technical Memo, RFC 3626, The Internet Society, pp. 1-6 (2003).
Sichitiu et al, "Simple, Accurate Time Synchronization for Wireless Sensor Networks," Proc. IEEE, WCNC pp. 1266-1273 (2003).
Mills, David L., "Internet Time Synchronization: The Network Time Protocol," IEEE Transactions on Communications, 39:10; pp. 1482-1492. (1991).
Ganeriwal et al, "Timing-sync Protocol for Sensor Networks," Proc. ACM SenSys (2003).
Ebner et al, "Synchronization in Ad Hoc Networks Based on UTRA TDD" (2003).
Li et al., Global Clock Synchronization in Sensor Networks, Proc. IEEE Infocom (2004).
Maroti et al., "The Flooding Time Synchronization Protocol," Proc. ACM Sensys. (2004).
Elson et al., "Fine-Grained Network Time Synchronization using Reference Broadcasts," Proc. USENIX OSDI, pp. 147-163 (2002).
Werner-Allen et al, "Firefly-Inspired Sensor Network Synchronicity with Realistic Radio Effects," Proc. ACM Sensys, pp. 142-153 (2005).
Warneke et al, "Ultra-Low Power Communication Logic Circuits for Distributed Sensor Networks," UC Berkeley, 7 pgs (1998).
Warneke, "Ultra-Low Power Circuits for Distributed Sensor Networks (Smart Dust)," UC Berkeley, pp. 1-3 (printed Jun. 15, 2003).
Darabi et al, "An Ultra Low Power 900 MHz CMOS Receiver for Wireless Paging," Univ. of CA, Los Angeles, pp. 1-33 (May 17, 1998).
Liu et al., "A Bluetooth Scatternet-Route Structure for Multihop Ad Hoc Networks," IEEE J. on Selected Areas in Communications, 21:2(229-39); Feb. 2003.
Salkintzis et al., "Performance analysis of a Downlink MAC Protocol with Power-Saving Support," IEEE Transactions on Vehicular Tech., 49:3(1029-40); May 2000.
Chlamtac et al., "An Energy-Conserving Access Protocol for Wireless Communication," Proc. of Int'l. Conf. on Comm., pp. 1-4 (Jun. 1997).
Office Action dated Sep. 8, 2006, U.S. Appl. No. 10/786,288.
Office Action dated Mar. 30, 2007, U.S. Appl. No. 10/786,288.
Office Action dated Sep. 25, 2007, U.S. Appl. No. 10/786,288.
Office Action dated Jun. 15, 2007, U.S. Appl. No. 10/677,945.
Office Action dated May 7, 2007, U.S. Appl. No. 11/078,257.
Office Action dated Dec. 12, 2007, U.S Appl. No. 10/677,945.
Shurbanov et al., "Energy-Efficient Flooding in Mobile Ad-Hoc Networks", Proceedings of 23rd Annual Army Science Conference, Orlando, FL, 2 pages (2002).
Office Action dated Mar. 15, 2010, U.S. Appl. No. 12/229,039.
Office Action dated Jul. 2, 2010, U.S. Appl. No. 11/895,527.
Office Action dated Jul. 7, 2010, U.S. Appl. No. 11/439,320.
Office Action dated Jul. 20, 2010 U.S. Appl. No. 11/656,767.
Office Action dated Sep. 8, 2010 U.S. Appl. No. 12/229,039.
Office Action dated Jan. 7, 2011 U.S. Appl. No. 11/656,767.
Office Action dated Jan. 13, 2011 U.S. Appl. No. 11/895,527.

* cited by examiner

600
Application
622
610
623
Socket API
602
625
627
624
JTP
UDP
TCP
IP
626
608
620
Routing / Path Management
Forwarding
Neighbor Discovery
628
606
616
618
LinkChar
DLL
Low Power/ Low Data Rate Radio
High Power/ High Data Rate Radio
604
612
614

SYSTEMS AND METHODS FOR ENERGY-CONSCIOUS COMMUNICATION IN WIRELESS AD-HOC NETWORKS

CROSS REFERENCE TO RELATED APPLICATIONS

This application claims priority from U.S. Provisional Application No. 60/840,417, filed Aug. 25, 2006, the disclosures of which are incorporated herein by reference in their entirety.

GOVERNMENT CONTRACT

The U.S. Government has a paid-up license in this invention and the right in limited circumstances to require the patent owner to license others on reasonable terms as provided for by the terms of Contract No. NBCHC050053 awarded by DARPA ATO.

FIELD OF THE INVENTION

The present invention relates generally to wireless ad-hoc networks and, more particularly, to systems and methods for minimizing energy consumption associated with communication in such networks.

BACKGROUND OF THE INVENTION

Large distributed sensing and communication environments often do not have established communication infrastructures. In such environments, wireless ad-hoc networks are used to regulate communication among devices, often over a shared medium that may only accommodate a limited number of simultaneous transmissions at any given time. Wireless ad-hoc networks in such a shared medium may implement functionality at each device for allocating access to the medium so as to minimize the amount of data lost due to network limitations. In particular, transport protocols are used by wireless ad-hoc networks to specify the manner in which data is transmitted between devices. Typically, these transport protocols are designed to enhance transmission qualities without consideration towards energy efficiency or varying levels of reliability requirements among different types of applications.

Hence, there is a need for transport protocols capable of minimizing energy expenditure while overcoming various network limitations to meet the requirements of different applications.

SUMMARY OF THE INVENTION

According to one aspect, the invention relates to a method of setting transmission parameters at a first node for a second node in an ad hoc network, based on information transmitted from the second node. In this method, the first node transmits a plurality of packets to the second node along a path. Each packet collects path quality measurements, for example, in its header, as it traverse the path. Path quality measurements include, for example, the amount of energy required to transmit the packet along the path and a minimum availability rate of nodes along the path. The second node, upon receipt of the packets aggregates the path quality measurements collected by the packets. Based on the aggregated data, the second node adjusts a feedback schedule it uses to send transmission parameters back to the first node. In one implementation, the feedback schedule is periodic in nature.

The second node sets a transmission parameter for the first node to use in future transmissions to the first node and transmits the parameter to the first node in a feedback message. Illustrative transmission parameters include an energy budget and a data transmission rate for the first node. The energy budget is determined based on the end-to-end energy expended in transmitting received packets to the second node. The data transmission rate is determined based on the minimum availability of nodes along the transmission path. In one implementation, the transmission parameters are set based on data collected in packets transmitted as part of initiating a connection between the first and second nodes. In one implementation, the transmission parameters are adjusted by the first node based on reliability requirements of application to which a packet is associated.

The feedback message is transmitted according to the adjusted schedule. The second node adjusts the feedback schedule by sending feedback messages to the first node prior to a subsequent scheduled periodic message in response to detecting a significant and persistent change in the path between the first and second nodes. In one particular implementation, the node detects the significant and persistent change in the connection path using a flip-flop filter.

According to another aspect, the invention relates to a method of forwarding a packet based on a per-node loss tolerance associated with the packet. The method includes receiving a packet with a per-node loss tolerance at a first node and forwarding it to a next hop node. In one implementation, the node maintains a copy of received packets in a cache, for example as array of packet lists and a hashing function.

The node then determines whether the packet failed to reach its destination. If the packet fails to reach its destination, the node determines to retransmit the packet based on the per-node loss tolerance associated with the packet, and acts accordingly. The determination, in one implementation is based in part on a per-packet energy budget. If after determining that the next hop node has failed to receive the packet, the node may attempt, if it determines that the next hop node is unresponsive, to transmit the packet to a second next hop node.

According to a third aspect, the invention relates to a stack architecture. The stack includes an interface between a transport layer and an application layer that maps data from an application executed at the application layer into packets at the transport layer. The stack also includes an interface between the transport layer and the link layer and/or the physical layer, that bypasses the intervening network layer. Via these interfaces, the link layer provides the transport layer characteristics of network links and the physical layer provides the transport layer information about packet transmission energy requirements. More particularly, over the interface between the transport layer and the link layer (also referred to as the data-link layer), the transport layer instructs the link layer to transmit a packet according to a number of transmission attempts computed based on a per-node loss tolerance parameter associated with the packet. The transport layer, in various implementations, is also configured to obtain characteristic information about nodes and links from a neighbor discovery module of the link layer via the interface. For example, the transport layer may use the interface to obtain path loss and path loss rates.

According to a fourth aspect, the invention relates to a transport protocol for an ad hoc network. The transport protocol includes at least one module implemented on intermediate nodes of a network and at least one other module implemented at least at the end nodes of the network. The at least one intermediate node module is configured to forward received packets, limit retransmission of received packets based on a per-node loss tolerance associated with respective received packets, and update forwarded packets to reflect the amount of energy the intermediate node expended in forwarding the respective packets. In one implementation, the at least one module implemented on intermediate nodes is configured to limit retransmissions of the received packets failing to reach their destination according to per-packet energy budgets of the respective packets. The at least one node implemented on intermediate nodes may also be configured to cache a received packet until receipt of the packet by a destination nodes is acknowledged, the energy budget for the packet is expended, or a cache replacement policy implemented on the intermediate node requires the packets deletion from the cache to make room for other received packets.

The at least one end node module is configured to set per-node loss tolerances for transmitted packets based on reliability requirements of applications associated with the respective transmitted packets, and transmit path characteristic messages to other end nodes of the network indicating characteristics of paths through the network derived from data obtained from headers of packets received from the respective other end nodes. In one implementation of the protocol, the path characteristic messages include a transmission sending rate for another node to use in transmitting packets to the end node transmitting the path characteristic message. The rate is determined based on availability data aggregated in headers of packets received by the end node over the path. In another implementation, the at least one module implemented on end nodes of the network is configured to set the per-node loss tolerances of respective packets based on reliability requirements of applications associated with respective packets.

BRIEF DESCRIPTION OF THE DRAWINGS

The invention may be better understood from the following illustrative description with reference to the following drawings.

DETAILED DESCRIPTION

Figure 1:
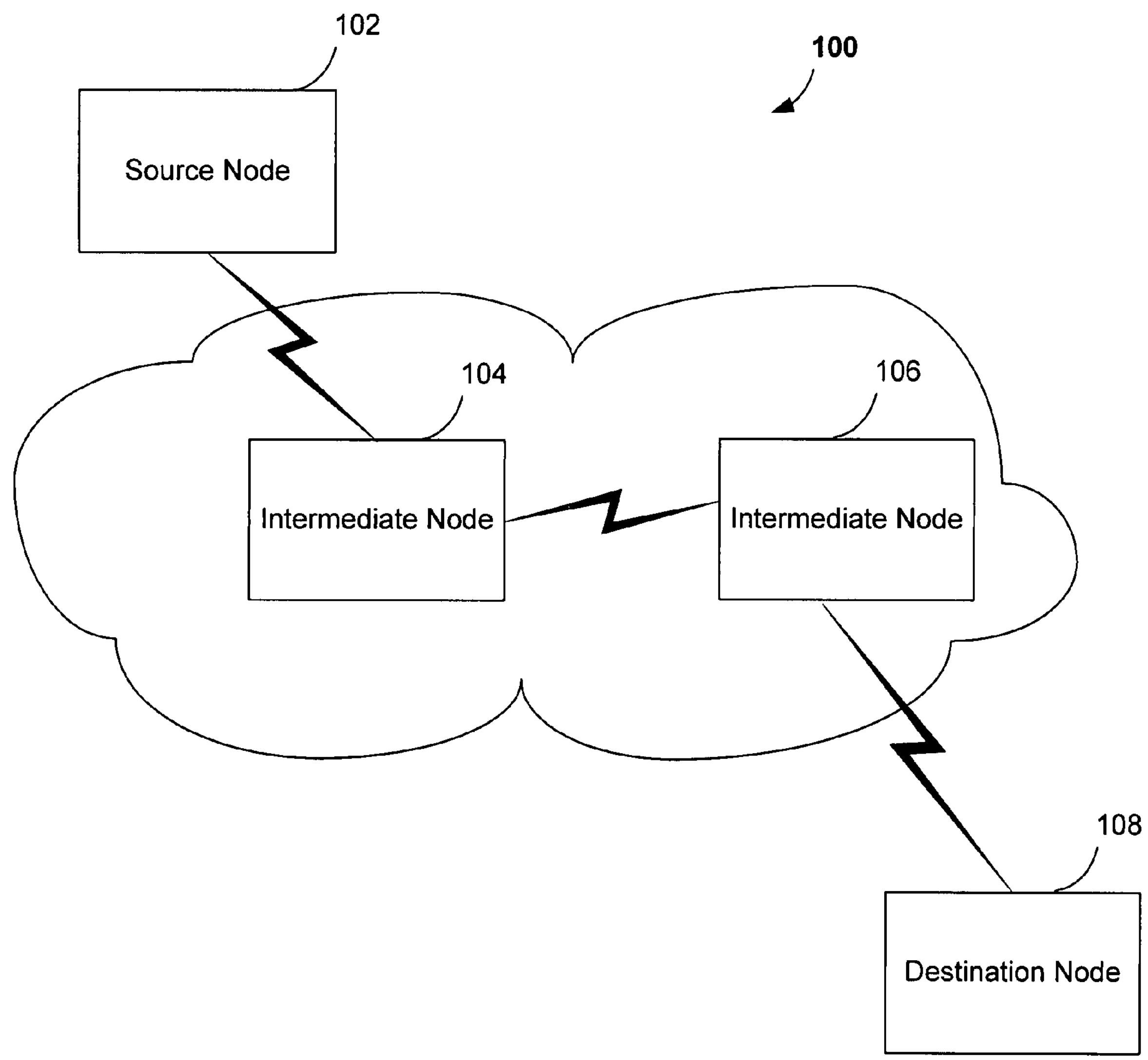
FIG. 1 is a diagram of a wireless network according to an illustrative embodiment of the invention.

FIG. 1 depicts a block diagram illustrating an exemplary network 100 having a number of nodes representative of multiple devices in the network 100. In certain implementations, each node employs a stack, having one or more protocol layers, for communicating with other nodes. For example, a stack may include a transport protocol layer that specifies the manner in which a packet is delivered between any two nodes. In certain implementations, the transport protocol is designed to be end-to-end such that a packet may be transmitted from a source node to a destination node via one or more intermediate nodes of the network. For example, as shown in FIG. 1, end-to-end transmissions ensure that source node 102 is able to transmit data to destination node 108 via intermediate nodes 104 and 106. Furthermore, the source node 102 retains a copy of a transmitted packet until it receives an acknowledgement from the destination node 108 that the destination node 108 has successfully received the packet. In addition to ensuring transmission reliability, the transport protocol is also configured to promote energy efficiency by exploiting energy-reducing opportunities generated from variability in delivery reliability requirements of different applications. Applications of varying importance and quality of service requirements have varying reliability demands for data transmission. For example, limited numbers of voice over IP packets can be lost without the recipient losing the meaning of a communication. In contrast, other applications require highly reliable communications between source and destination, for example to reconstruct large files from multiple packets. Hence, a transport protocol that is configured to support application-determined reliability requirements is able to operate more efficiently than a transport protocol offering only a particular reliability model. In the latter case, it becomes an application's responsibility to choose an appropriate transport protocol whose advertised reliability model most closely meets the application's delivery demand. The claimed invention, in various illustrative embodiments, presents a single transport protocol capable of supporting applications having a wide range of reliability levels.

In one embodiment, the transport protocol of the present invention employs a variable destination-controlled feedback mechanism to set parameters for specifying transmission criteria of a packet. Exemplary transmission parameters include an energy budget, a sending data rate, and one or more retransmission requests in the case that the packet is missing or lost. According to this feedback mechanism, a destination node, such as node 108 of FIG. 1, is used to control the setting of the transmission parameters so that quality of a forward transmission path from the source node 102 to the destination node 108 is not intertwined with that of the reverse path for updating transmission parameters. This feedback mechanism is generally divided into two processes, a path monitoring process and a control update process. In the path monitoring process, the destination node 108 monitors path conditions and provides feedback to the source node 102 only when significant and prolonged changes are detected on the path. In the control update process, upon receiving feedback information from the destination node 108, the source node 102 is adapted to update the transmission parameters accordingly.

Figure 2:
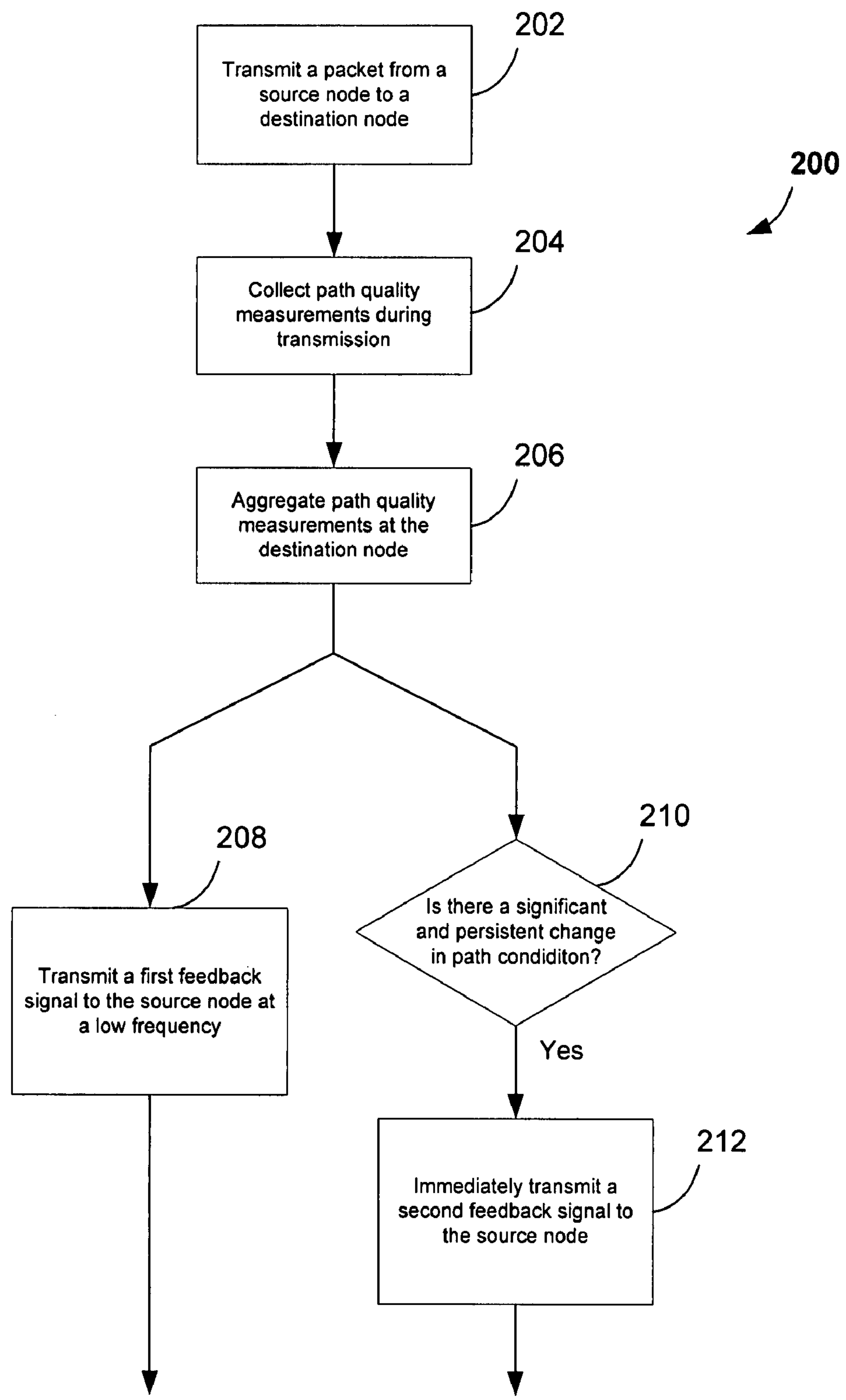
FIG. 2 is a flow diagram showing a path monitoring process of a destination-controlled feedback mechanism according to an illustrative embodiment of the invention.

FIG. 2 depicts an illustrative path monitoring process 200 of the destination-controlled feedback mechanism. Process 200 initiates at step 202 as a packet is transmitted from a source node to a destination node along a particular connection path between the two nodes. At step 204, the packet collects samples of path quality measurements at one or more intermediate nodes on the path. The format of the packet is described further below in relation to FIG. 5. The path quality measurements include, for example, end-to-end per-packet transmission energy associated with the path and a minimum available rate over all links of the path. At step 206, after the packet arrives at the destination node, the destination node aggregates the sample measurements taken by the packet and provides feedback to the source node regarding conditions of the connection path when appropriate. More specifically, as shown in step 208, the destination node is configured to periodically transmit feedback signals to the source node regularly with low frequency. In addition, as shown in step 210, if a significant and persistent change is detected in the state of a path based on the collected sample measurements, the destination node sends, at step 212, additional feedback signals to the source node to notify the source node of the changes in path conditions.

The feedback mechanism of steps 208, 210 and 212 may be implemented using an adaptive flip-flop filter that switches between two exponentially-weighted moving average (EWMA) filters depending on the noisiness of the collected measurements that are reflective of path conditions. In general, a current sample mean $\bar{x}$ and a moving range (i.e., a measured variance) $\overline{R}$ of an EWMA filter are defined as:

$$\bar{x}=(1-\alpha)\bar{x}+\alpha x_i$$

$$\overline{R}=(1-\beta)\overline{R}+\beta|x_i-x_{i-1}|,$$

where $\alpha$ is a constant that determines the filter's reactivity tied to the sample mean and $\beta$ is a constant that determines the filter's reactivity in relation to measured variance. In the case that $\alpha$ is small, the corresponding filter is slow to change, hence the corresponding filter is stable. Alternatively, if $\alpha$ is large, the corresponding filter tends to be agile and is able to detect changes quickly. In addition, one or more control limits may be defined around sample mean $\bar{x}$. For example, upper and lower control limits around $\bar{x}$ are expressed as:

$$\text{Upper\_Contorl\_Limit} = \bar{x} + 3\frac{\overline{R}}{d_2}$$

$$\text{Lower\_Contorl\_Limit} = \bar{x} - 3\frac{\overline{R}}{d_2},$$

where $d_2$ estimates the standard deviation of the sample in view of its range $\overline{R}$. Under normal operations, a stable EWMA filter is employed to detect a stable path condition. Using the EWMA filter with a small $\alpha$ and $\beta$ values filters out short-term variations in the sample measurements. Hence, as long as a sample measurement $x_i$ lies within the control limits, the state of the associated path is considered to be stable and feedback to the source node is only provided at a regular low frequency of every T seconds. However, if $x_i$ lies outside of the control limits, $x_i$ is considered to be an outlier measurement. A consecutive number of outlier measurements is indicative of a significant and persistent change in the state of the path, in which case an immediate feedback to the source node is triggered from the destination node. In an alternative implementation, the number of consecutive outlier measurements required to trigger an immediate feedback image must occur with a predetermined time period t, where t is less than T. At this point, the destination node employs an agile EWMA filter having a large $\alpha$ value to quickly adapt to changes in network conditions. In addition, once the path condition reverts back to a stable state where $x_i$ falls within the control limits, the destination node switches back to the stable filter for continued path monitoring. Preferably, the destination node only advertises transmission parameters to the source node when significant and prolonged changes are detected by the destination node on a connection path. Therefore, the frequency of the feedback is maintained as low as the stability and reliability of the network permits. By reducing feedback traffic to the source node, the variable path monitoring process 300 of FIG. 3 is able to reduce overall energy consumption, thereby extending the lifetime of the entire network.

Figure 3:
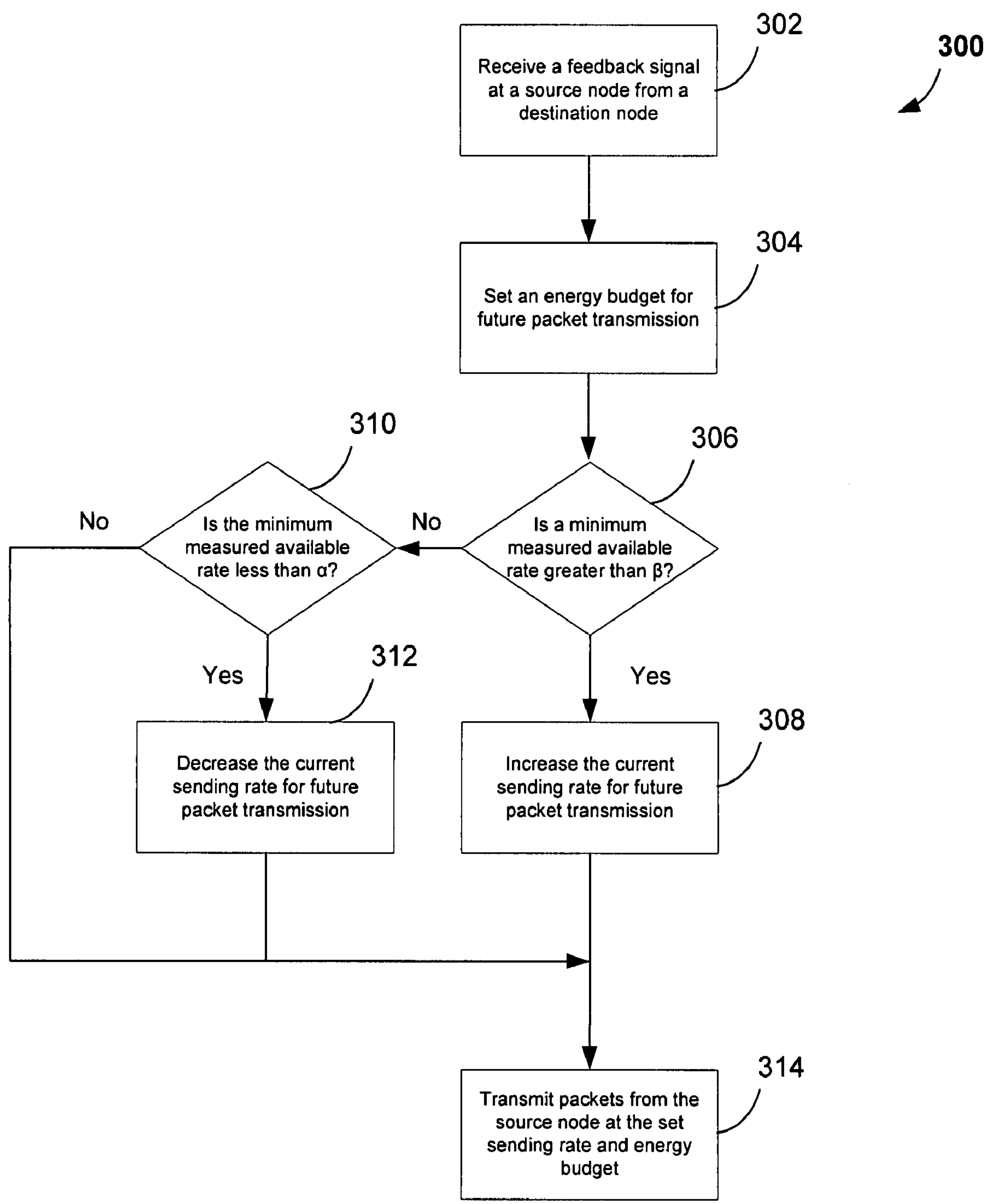
FIG. 3 is a flow diagram showing a control update process of the destination-controlled feedback mechanism.

FIG. 3 depicts an control update process 300 of the feedback mechanism. Upon receiving the feedback signal from the destination node at step 302, the source node proceeds to update one or more transmission parameters, such as per-packet energy budget and sending data rate, for controlling transmissions of future packets. At the source node, these transmission parameters may be initially set according to reliability requirements of the corresponding applications and subsequently adjusted based on path quality assessments aggregated at the destination node. More specifically, at step 304, process 300 sets the energy budget for transmitting future packets to the energy budget supplied by the destination node. Process 300 is also adapted to set the sending data rate for future packets using an adaptive approach implemented by a sending data rate controller of the source node. In one implementation, the sending node sets its sending data rate equal to a rate provided by the destination node. In another implementation, the sending node sets the sending data rate based on raw or aggregated availability data included in the feedback message from the destination node. Whether the data rate is determined by the destination or the source node, the nodes utilize the following approach.

An availability rate is determined based on an aggregation of availability data attached to the header of a packet as is traverses the network. The availability rate is the minimum of all the available rates measured for the path, and each available rate represents a node's current available reception capacity as determined by its current rate of idle receive-wakeup slots. Let $\hat{A}$ be such measured minimum available rate. At step 306, if it is determined that $\hat{A}>\beta$, where $\beta$, is a configurable parameter proportional to the current sending rate, for example, between 1.01 and 2.00 times the current sending rate, then the sending data rate for the next packet transmission, i.e., r(i+1), is increased at step 310. For example, the future sending rate may be increased in proportion to the current available capacity, $\hat{A}$, as well as in inverse proportion to the current sending data rate, i.e., r(i), so as to improve fairness among competing flows. This principle is mathematically expressed as:

$$r(i+1) = r(i) + \delta\frac{A(i)}{r(i)},$$
$$0 < \delta < 1,$$

where $\delta$ is a configurable parameter setting how aggressively sending rates should be increased. However, if it is determined at step 312 that there is little available rate associated with the path, i.e., $\hat{A}<\alpha<\beta$, then the source node decreases its current sending data rate multiplicatively, such that:

$$r(i+1)=\theta r(i),\ 0<\theta<1.$$

Otherwise, the sending data rate remains unchanged. In other examples, additional node-level information such as queuing delays or energy expended per successfully delivered bit may also be used in the determination of a sending data rate associated with a particular path. At step 314, the transport protocol applies the updated sending data rate and energy budget to the transmission of new packets or packets that need retransmission so as to minimize overall energy expenditure while accounting for changes in path conditions as well as satisfying delivery reliability requirements of different applications.

In another aspect of the present invention, the variable destination-based feedback control mechanism of the transport protocol as described above with reference to FIGS. 2 and 3 is combined with various in-network mechanisms to further enhance network-wide energy efficiency. One such in-network mechanism controls the amount of effort the network is allowed to expend on per-packet delivery at each intermediate node of a connection path. For example, if a packet is lost in transit, to avoid the packet having to be retransmitted from the source node, which may be a costly endeavor, retransmission may be initiated, instead, at certain intermediate nodes of the network where the packet is cached. In these cases, complete end-to-end retransmissions are avoided, thus yielding energy savings along the associated path. In addition, the total amount of energy used to transmit a packet from source to destination, as well as the number of retransmission attempts for a packet at a particular node is limited by an energy budget and by delivery reliability requirements of the application corresponding to the packet. For example, certain packets are more important than others. Hence, these packets have higher delivery reliability requirements and need to have a higher number of retransmission attempts than others. Such packets may also be granted higher energy budgets allowing for more total retransmissions along the path. By exploiting such variability in energy demands, the transport protocol is thus able to limit energy expenditure on a per-packet and per-hop basis.

An energy budget, in contrast to a time-to-live parameter utilized in many routing protocols, not only takes into a account a raw number of packet transmissions and retransmissions, it also takes into account an energy-related weighting associated with each transmission or retransmission. For example, the energy budget may be equal, proportional, or related to a total number of joules or other unit of energy available for use in forwarding the packet to its ultimate destination. Alternatively, the energy budget may just weight a transmission by the distance between the transmitting and receiving node.

The energy needed to transmit a packet from one node to another varies based on a number of factors, including, for example, distance, channel conditions, and the hardware of the respective nodes. In this implementation, each node, when transmitting or retransmitting a packet, obtains information from the radio layer of the node as to the amount of energy needed to transmit the packet to its next hop, and decrements the energy budget accordingly.

In more sophisticated implementations, nodes evaluate packet energy budgets based on estimates or knowledge of the remainder of the path a packet must traverse in reaching its destination. For example, if a packet at a node must make pass through three additional nodes in reaching its destination, the node need not wait until the energy budget is fully expended before dropping the packet. It need only attempt to retransmit the packet until the remaining energy budget would be insufficient to enable the remaining three hops to made.

In one implementation, the energy budget for a packet along a connection is based on the total energy expended in transmitting a connection establishment packet along a path from the source to the destination. In this case, the energy budget is set to a combination of the total energy, a reliability factor, and/or a volatility factor (to account for a likelihood of changing network topology). The energy budget may then optionally be updated as more information is gained about the connection between the source and destination obtained, for example, from acknowledgement messages.

As indicated above, in addition to, or instead of, utilizing a total path energy budget, in various implementations, the transport protocol utilizes a loss tolerance parameter corresponding to a particular reliability requirement to limit energy expenditure along a path. In such implementations, packets originating from applications requiring higher reliability are granted a lower loss tolerance. Packets originating from applications having lower reliability requirements, for example, VOIP, are granted a higher loss tolerance.

Figure 4:
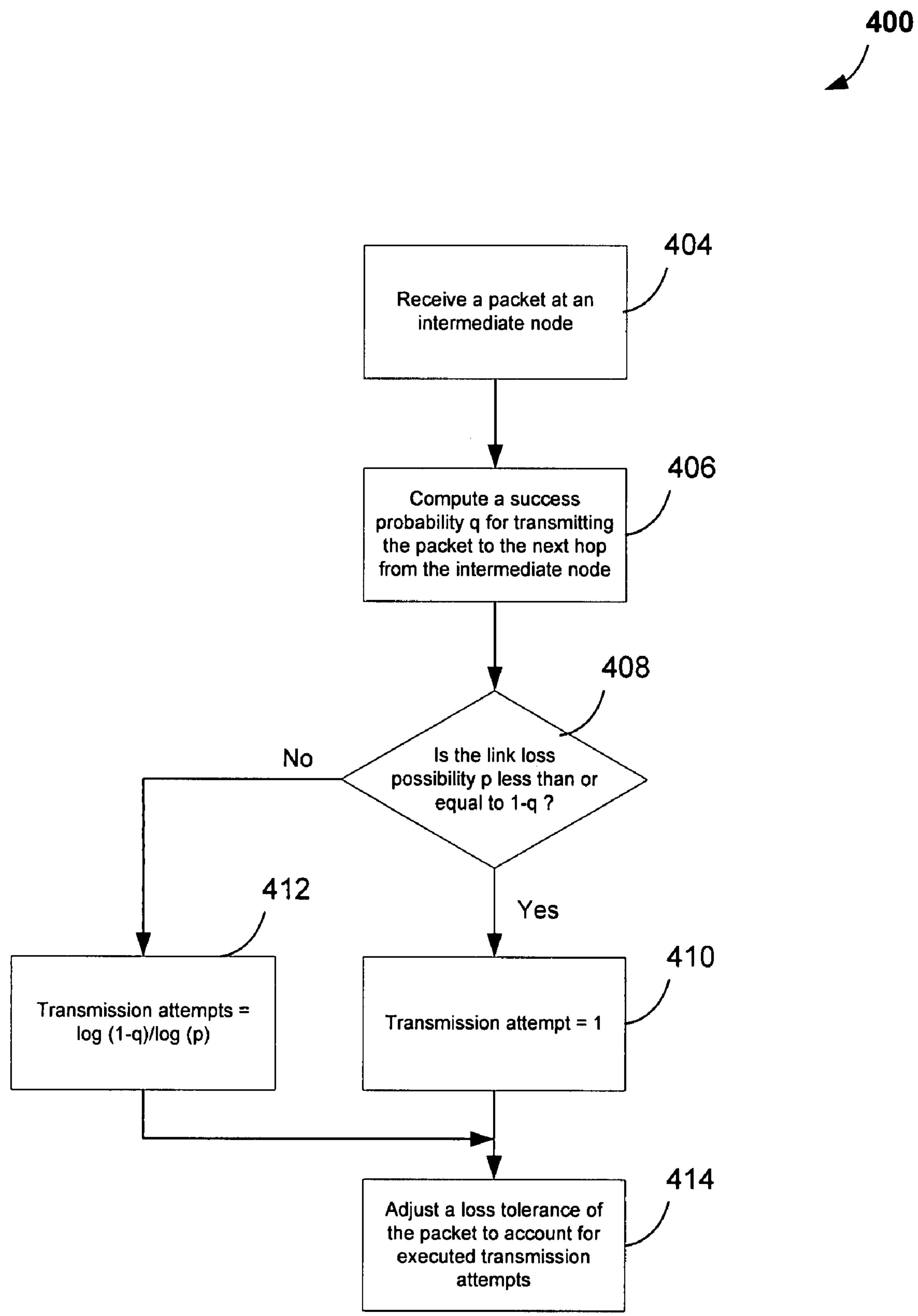
FIG. 4 is a flow diagram showing an in-network mechanism for controlling per-packet energy expenditure according to an illustrative embodiment of the invention.

FIG. 4 depicts an illustrative process 400 for implementing an in-network mechanism for controlling per-packet energy expenditure at an intermediate node i based on a loss tolerance requirement. As shown, at step 404, node i receives a packet having an energy budget and a loss tolerance encoded in the header of the packet. This loss tolerance is set according to the end-to-end reliability requirement of the corresponding application. In one implementation, the per-packet loss tolerance may also be adjusted by the destination-controlled feedback mechanism as described above, where path quality metrics related to energy consumption are used to adapt the tolerance level. In general, this loss tolerance can be allocated over individual links of a connection path so that, during connection establishment at each link, a number of local transmission attempts are computed to satisfy the allocated link-level requirement. More specifically, let $l_{ti}$ be the loss tolerance that is encoded in a packet when received by node i at step 402. Let $N_i$ be the number of hops from node i to the destination node. Using these parameters, process 400 is able to compute, at step 406, a success probability q required to transmit the packet to each subsequent hop j according to the following expression:

$$q = (1 - l_{ti})^{\frac{1}{N_i}}.$$

Furthermore, let $p_i$ be the link loss probability over the link from node i to the next hop. If process 400 determines at step 408 that $p_i \leqq (1-q)$, then process 400 is adapted to only attempt to transmit the packet once from node i at step 410. Otherwise, the number of transmission attempts $t_i$ form node i is calculated at step 412 as:

$$t_i = \frac{\log(1-q)}{\log(p_i)}.$$

At step 414, before the packet is forwarded from node i to the next hop in accordance with the calculated transmission attempts, process 400 adjusts the loss tolerance carried in the header of the packet to ensure that any remaining retransmission attempts calculated for node i are not used by downstream nodes. In particular, process 400 may adjust the loss tolerance encoded in the packet header as follows:

$$l_{t(i+1)} = 1 - \frac{1 - l_{ti}}{q_i}.$$

This energy-update approach 400 illustrated in FIG. 4 tends to be robust against path changes. For instance, if a path is longer (or shorter) than expected, the transmission parameters associated with a packet are recalibrated along the transmission route. Moreover, by calculating the expected energy to transmit the packet to the destination node using this hop-by-hop approach and by having intermediate nodes updating the loss tolerance as they transmit the packet, the packet may be dropped if its budget is exhausted or the number of local attempts is exceeded. A packet may also be dropped if the packet faces a sudden change in network conditions where some links temporarily become energy consuming, for example. In this case, the packet can be retransmitted from the source node at a time when the network conditions return to normal. If the network conditions do not change, the source node will eventually adapt to the new energy requirement through the variable destination-based feedback mechanism as described above and update the loss tolerance for each packet accordingly.

In another aspect of the invention, the transport protocol implements an in-network caching scheme to support the in-network energy control mechanism described above with reference to FIG. 4. If a packet delivery fails at an intermediate node along a path, the intermediate node may attempt to re-deliver the packet if the packet is present in its cache. However, if the cache is full and a newly-arrived packet needs to be inserted into the cache, a cache replacement policy is implemented by the transport protocol that specifies the manner in which an existing packet in the cache is replaced by the newly-arrived packet. In certain implementations, the cache replacement policy is time-based, and the packets are ranked according to the amount of time they have been cached. For example, a time-based cache replacement policy may be first-in-first-out (FIFO), in which case the packet being replaced in the cache is the packet that was the first to arrive in the cache. In certain implementations, the cache replacement policy is usage-based, and the packets are ranked in the cache according to the elapsed time since they were manipulated, such as being inserted or attempt to be retransmitted. Usage-based replacement policies may be defined according to most recent usage (MRU) or least recent usage (LRU) of packets, in which case the packet being replaced is the most, or least, recently manipulated. In certain implementations, the cache replacement policy is location-based, and the packets are ranked according to their proximity to destination. One exemplary location-based policy is a hop-based policy that gives packets having fewer hops away from their destinations higher priorities in the cache (i.e., such packets are less likely to be removed) so that energy expenditure associated with successful packet deliveries may be reduced. In certain embodiments, a packet is given a higher priority to be cached, or to remain in a cache, at a node if the destination of the packet is closest to the node in comparison to the destination of other packets waiting to be cached. Otherwise, in one implementation, the packet is directed to a memory-abundant node for storage until the packet's connectivity to the destination is restored. An exemplary cache structure used by the transport protocol to support such in-network caching scheme will be described below with reference to FIG. 7.

Other features of a transport protocol include a receiving-wakeup controller configured to adjust the probability of a node waking up to receive packet transmissions from other nodes. This adjustment may be made based on a current utilization level of the wakeup slots associated with the node. Hence, the node needs to be able to estimate its own resources such as rate of energy consumption and available energy. Exemplary types of a receiving-wakeup controller include a multiple-input-multiple-output (MIMO) control for simultaneously measuring and regulating multiple resources of a node and a stochastic control for taking into consideration probabilistic disturbances and noises at a node.

In yet another aspect of the present invention, an in-network deflection routing mechanism is employed by the transport protocol to recover from a short-term local delivery error at an intermediate node. In certain examples, the deflection routing mechanism is initiated based on a next hop being temporarily down or non-responsive or an occurrence of buffer overflow at the next hop. The scope of the deflection may comprise a single hop or multiple hops. In a single-hop deflection scheme, a current node may choose an immediate neighboring node to re-route a packet if the new next hop from the current node to the neighboring node has a lower path weight than the original next hop. However, if no such neighboring node exists, the current node is adapted to send a signal to its predecessor node to reroute a copy of the packet from the cache of the predecessor node. In a multi-hop deflection scheme, a loose-source routing technique is performed that allows a current node to traverse its neighborhood of nodes, and the scope of nodes that are candidate for such deflection routing may be controlled by the stability of the neighborhood.

Figure 5:
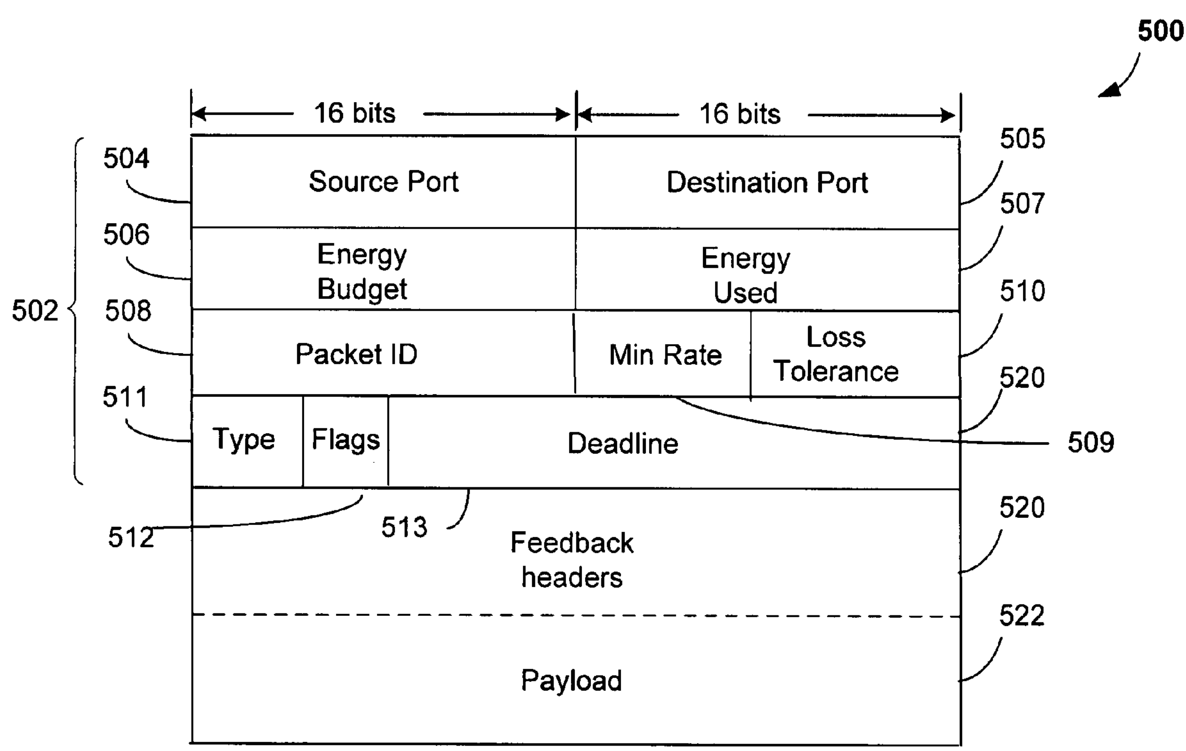
FIG. 5 is a block diagram of a packet according to an illustrative embodiment of the invention.

FIG. 5 depicts an exemplary format of a portion of a packet 500 that is generated by the transport protocol for transmission in a wireless ad-hoc network, such as network 100 of FIG. 1. As shown in FIG. 5, packet format 500 is generally divided into two sections, a transport layer packet header section 502 and a payload section 524. The transport packet header 502 is preceded by link layer and MAC layer header information attached by the link layer and MAC layer of a node, respectively. Such header information falls outside the scope of this invention. The transport packet header, in the illustrative implementation includes 10 fields, including 128 total bits. Transport layer packet headers may include fewer or additional fields and fewer or additional bits per field without departing from the scope of the invention.

The first field 504 of the transport layer packet header section 502 contains a 16-bit source port number of a source node. The second field, the destination port number field 505, stores a 16-bit port for the destination node associated with the packet 500. The transport layer packet header section 502 also includes two energy related fields, fields 506 and 507. Field 506 stores a total energy budget for the packet, and field 507 stores the total energy used to date in attempting to transmit the packet 500 to its destination. Field 508 stores a packet ID number, field 509 stores a minimum availability rate of the nodes traversed along the path, and field 510 stores a loss tolerance parameter for the packet 500. Field 511 stores a packet type identifier (e.g., data, acknowledgement or connection establishment), and a flag field 512 that stores flags for various management functions. In addition, the transport layer packet header section 502 includes a deadline field 513 that indicates a real-time expiration time for the packet, which, if passed, even if the packet has energy remaining in its budget, results in the packet being dropped.

The last field of the transport layer packet header section 502, a feedback field 520, is configured to carry all cumulative positive acknowledgments, selective negative acknowledgements, and ID's of packets that have been retransmitted by one or more intermediate nodes and, therefore, do not need to be retransmitted. Furthermore, the feedback field 522 includes bit vectors encoding contiguous blocks of successfully and/or unsuccessfully transmitted packets, bit vectors encoding missing packets, a current feedback-reporting period used by the destination node, and the sending data rate and per-packet energy computed by the destination node. In implementations, when the feedback field 522 includes a bit vector indicating data packets that were not successfully received, it is assumed that all packets not included in bit vector have been successfully received.

Figure 6:
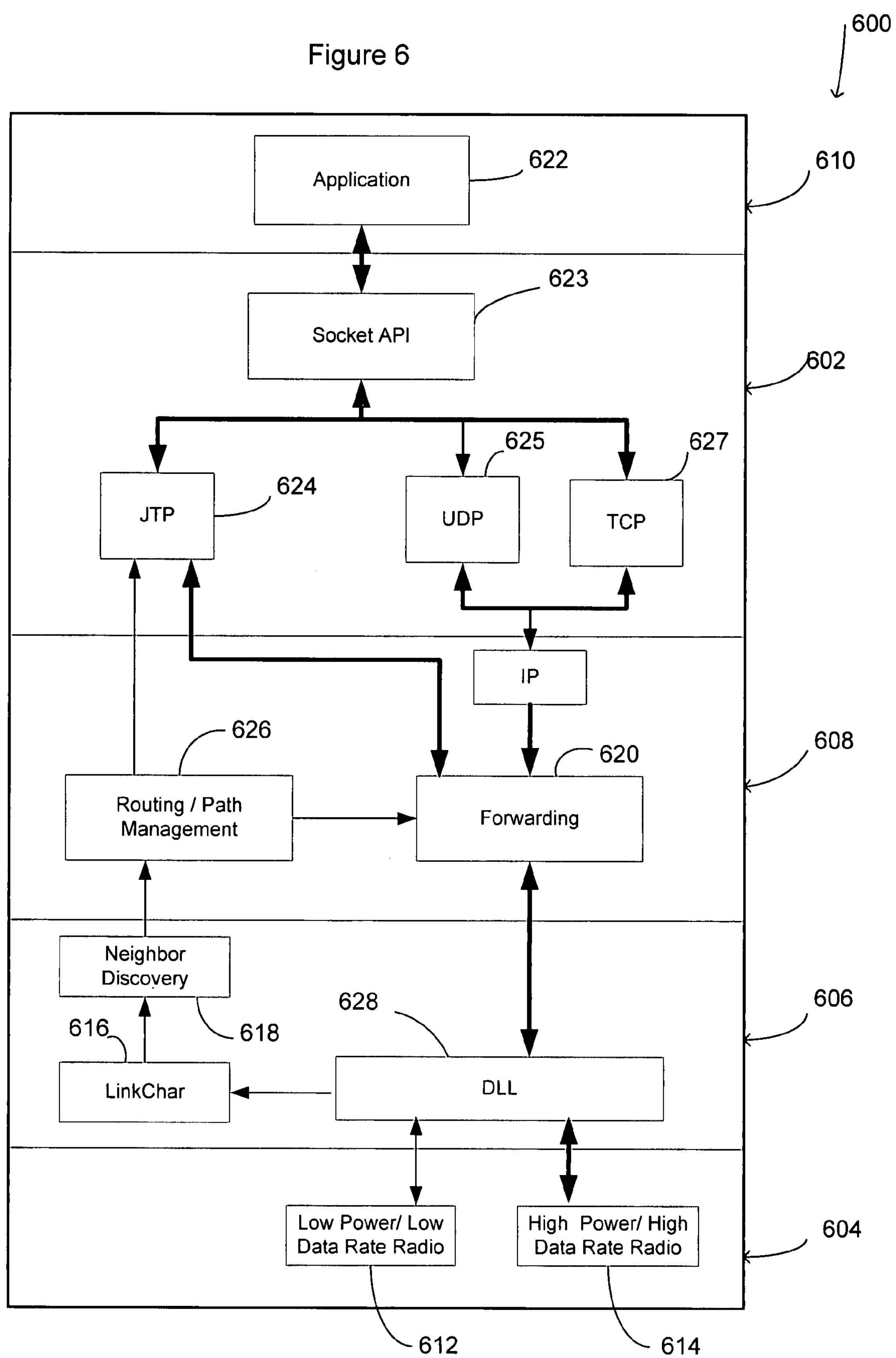
FIG. 6 is a block diagram of a stack architecture according to an illustrative embodiment of the invention.

FIG. 6 illustrates a block diagram of an exemplary stack architecture 600 including a transport protocol layer 602. The heavier arrows indicate the path of application data through the stack from the application to wireless node's radio, and visa versa. The lighter arrows indicate the path of control information, such as routing information and the collected path quality measurements.

This stack architecture may be implemented at any node in a wireless network, such in as network 100 of FIG. 1, for performing the various error control, service quality control, in-network caching, in-network deflection routing and path quality assessment mechanisms described above with reference to FIGS. 1-4. Preferably, the architecture is implemented on all nodes in the network. The stack architecture 600 also includes a physical protocol layer 604, a data link layer 606, a network protocol layer 608, and an application protocol layer 610. In addition to interacting with the layers immediately above and below, as is typical in other stack protocols, the transport layer 602 is further configured to perform cross-layer interactions with other layers in the stack architecture 600. For example, the transport layer 602 is configured to interact directly with the link layer 606 and with the physical or radio layer 604. These sophisticated cross-layer interactions enable the transport protocol to expend minimal resources when performing end-to-end transmission of packets throughout a wireless network.

For example, one type of cross-layer interaction implemented in the stack architecture 600 that skips an intervening layer of the stack is between the transport layer 602 and the physical layer 604 (also referred to as the radio layer in wireless nodes) of stack 600. The physical layer 604 is generally configured to deliver data bits between adjacent nodes in a network environment, and it achieves such data delivery using, for example, two types of radios including of a low-data rate, energy optimized hail radio 612 and a high-data rate, frequency-hopping data radio 614. In operation, the hail radio 612 wakes up the data radio 614 for packet delivery only when necessary. The hail radio 612 also establishes and maintains time synchronization of the data radio 614. In alternative implementations, the physical layer 604 may employ a single one-mode or multi-mode radio. By closely interacting with the physical layer 604, the transport layer 602 is able to obtain packet-level transmission quality information such as link path loss or received signal strength indication (RSSI). The transport layer 602 is also able to use the received information to compute packet-level transmission parameters such as per-packet transmit energy which allows the transport protocol to budget an appropriate level of power for reliable one-hop transmission, in addition to keeping track of energy consumption.

Another type of cross layer interaction implemented in various implementations of the stack architecture that bypasses an intervening stack layer is an interaction between transport layer 602 and the data-link layer 606 of stack 600. In general, the data link layer 606 is adapted to generate reports regarding characteristics of various links from a local node to its neighboring nodes, herein referred to as "link metrics," as well as characteristics of the local node itself, herein referred to as "node metrics." Exemplary node metrics include an available receiving bandwidth. Exemplary link metrics include path loss measured for each link and a packet loss rate measured based on the fraction of unsuccessful link-layer transmissions to each neighbor. The packet loss rate may be used by the transport protocol to compute, for each packet, a number of link-layer transmission attempts needed to meet an application's reliability requirement. In one implementation, the link metrics are computed at a link characterization module 616 of the data-link layer 606. In one implementation, the metric reports, including the link metrics computed at the link characterization module 616, are provided to the transport layer 602 via a neighbor discovery module 618 of the data link layer 606 and a routing and path management module 626 of the network layer 608.

Furthermore, the data-link layer 606 is configured to support multiple transmission attempts at the local node, where the number of transmission attempts is calculated through the interaction between the transport layer 602 and a DLL module 628 of the data link layer 606. For instance, before transmitting a packet, the DLL module 628 computes the energy that is to be expended for the packet transmission and subsequently subtracts this energy from the total energy budget of the packet. The DLL module 628 computes this allowable per-hop energy expenditure based on a size of the packet and transmission power of the packet which are stored in a radio profile of the packet along with other transmission parameters. Moreover, in order for the transport layer 602 to make sophisticated choices about packets, the transport layer 602 needs to know the fate of each packet after transmission. To this end, the DLL module 628 notifies the transport layer 602 of the transmission status of each packet, such as whether the packet is dropped or transmitted successfully. In addition, the transport layer 602 may instruct the data-link layer 606 to drop a packet when the remaining energy budget for the packet is not enough for another transmission. For example, in the case that a transmission attempt of a packet is not successful, the DLL module 628 checks with the radio profile of the packet to see if any transmission attempts remain or if the packet should be dropped. If there are remaining transmission attempts, the DLL module 628 proceeds to check if there is enough energy for another transmission. If not, the packet is dropped.

In certain embodiments, to deliver data packets from a local node to a neighboring node, the data link layer 606 uses a slotted probabilistic protocol that employs pseudo-random codes to implement uncorrelated, but predictable, schedules for the hail radio of the physical layer 604 to wake up the neighboring node. For example, when the data-link layer 606 associated with the local node predicts that the hail radio of its neighboring node is on, the local node uses its own hail radio 612 to request the neighboring node to wake up its data radio for data reception. One suitable scheduling method is described in U.S. patent application Ser. No. 11/078,257, entitled, "Methods and Apparatus for Reduced Energy Communication in an Ad Hoc Network," the entirety of which is incorporated herein by reference.

A third type of cross-layer interaction is defined between the transport layer 602 and the network layer 608 of stack 600. The network layer 608 is configured to collect link-state information from neighboring nodes using, for example, a hazy-sighted scoping technique such that more frequent link-state updates are received from closer neighboring nodes than from those that are further away. One suitable technique is described further in U.S. patent application Ser. No. 11/347,963, entitled, "Methods and Apparatus for Improved Efficiency Communication," the entirety of which is incorporated herein by reference. In addition, the network layer 608 uses knowledge of the transmission power at the neighboring nodes to build a connection set that is reflective of current link-state dissemination. Based on such link-energy topology, the network layer 608 is able to compute minimum link-weight paths to destinations and compile the computed information in a forwarding table. Each link weight of the forwarding table may be computed based on the energy needed to execute a reliable one-hop transmission. In certain examples, forwarding tables for all known destinations are stored in the routing and path management module 626 of the networking layer 608. Hence, through its interaction with the network layer 608, the transport layer 602 is able to use the forwarding tables to accurately transmit packets to destination.

Furthermore, a forwarding module 620 of the network layer 608 allows the transport protocol to influence transmission parameters used by the data link layer 606 for transmitting packets. Exemplary transmission parameters of a packet that are adjustable by the transport protocol include transmission power, number of link access attempts, number of data transmissions, and packet priority. These transmission parameters are stored in a radio profile of the packet which is registered with the forwarding module 620 of the network layer 608 whenever a transmission parameter is changed by the transport layer 602.

A fourth type of cross layer interaction is defined between the transport layer 602 and the application layer 610. An application 622 in the application layer is adapted to interface with the transport layer through an API 623 that directs messages to the appropriate transport protocol. For example, the API 623 may direct packets to the JTP module 624 to take advantage of the energy efficiency provided by the systems and methods described herein, or they may be directed to the standard transport protocol modules, such as a UDP module 625 or a TCP module 627. The JTP module 624 which maps application-level data to and from individual packets. For example, after detecting a delivery requirement of an application in the application layer 610, the transport layer 602 is able to instruct the lower layers in the stack architecture 600 to translate the delivery requirement into specific energy demands or budgets for individual packets, where each energy budget governs the manner with which the corresponding packet is transmitted in an ad-hoc network. Thus, the transport layer 602 serves as an energy-conscious interface between the application layer 610 and the lower layers. This arrangement allows the transport layer 602 to determine variability in delivery service requirements for different applications and, in response, provide suitable levels of packet transmission reliability corresponding to the application-level data. Hence, instead of providing different transport protocols for different applications, the stack architecture 600 only needs to provide a single protocol that offers a range of reliability levels adaptable to different application requirements.

Figure 7A:
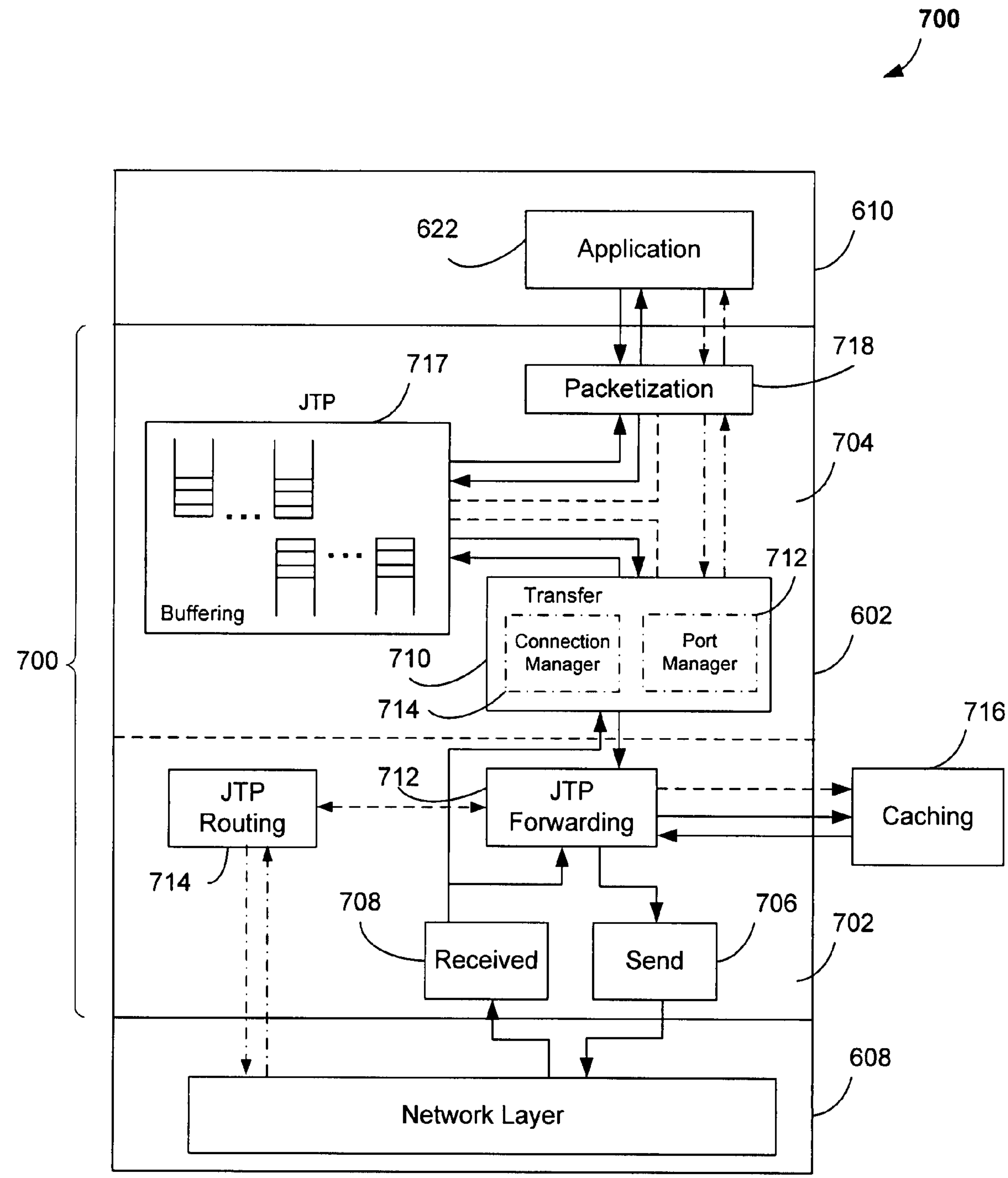
FIG. 7A is a block diagram of a first transport protocol layer of the stack architecture.

FIG. 7A provides an exemplary configuration of one implementation 700 of the JTP module 624 of transport layer 602 of FIG. 6. As shown, the JTP module 624 includes a number of functional modules generally divided into two categories, where the first category of modules 702 are implemented on all nodes of a wireless network and the second category of modules 704 are implemented only on end nodes, namely source and destination nodes of the network. In the first category 702, a send module 706 is used to convert each outgoing packet from its structured format, such as format 500 of FIG. 5, into a string buffer before passing the packet to the network layer for forwarding to its destination. This module 706 is also responsible for creating and registering radio profiles with the network layer 608, where each radio profile is assigned to a packet based on QoS requirements encoded in the header of the packet. The first category of modules 702 also includes a receive module 708 that is configured to receive all incoming packets from the network layer 608 and convert each packet to a structured format before passing it to an appropriate module for de-multiplexing based on its destination. In the case that the packet has reached its destination, the receive module 708 is adapted to forward the packet to a transfer module 710 of the JTP module 624. Otherwise, the packet is passed to a forwarding module 712 of the JTP module 624 for continued transmission to the destination. In addition to being responsible for correctly forwarding all packets, the forwarding module 712 is also responsible for tasks such as obtaining the next hop address for transmitting packets from a routing module 714, caching data packets, invoking local recovery mechanism upon receiving an acknowledgement packet, and updating the header of each packet based on local nodal information, such as available rate and energy information. Moreover, as described above, the data link layer 606 provides the forwarding module 712 feedback on the result of each packet transmission. Based on this feedback, the forwarding module 712 is able to proactively execute tasks such as attempting to find an alternative next hop for deflection routing when the current link to the next hop is down and the routing path has not yet been updated. Furthermore, the routing module 714 of the first category of modules 702 is adapted to receive reports of various link statistics, such as path loss or loss rate information, by directly interacting with the network layer 608. Based on such interaction, the routing module 714 is able to maintain a table of active links and necessary statistics in addition to maintaining one or more forward tables used by the forward module 712. In certain implementations, the routing module 714 maintains the forward tables by locally copying the same tables from the routing and path management module 626 of the routing layer 606, as shown in FIG. 6.

With continued reference to FIG. 7, a caching module 716 in the first category of modules 702 is responsible for managing a cache structure associated with a particular node. Exemplary responsibilities of the caching module 716 include looking up packets and inserting packets into or deleting packets from the cache structure. In one implementation, the cache structure comprises an array of packet lists, where each array element corresponds to one cache slot and is associated with an embedded linked list of packets. Packet insertion and deletion is governed by a hash function of the cache structure which maps a packet to a cache slot. More specifically, the hash function indexes a packet to a cache slot according to the packet's signature information stored, for example, in the header section of the packet. Furthermore, multiple packets that are hashed to the same cache slot are placed in an embedded linked list in the order of their insertion times. As described above, packets may be inserted into the cache according to a LRU, MRU or FIFO scheme. Moreover, the caching module 716 ensures that there are no duplicate packets in the cache. For example, if a packet is received twice at a node, the caching module 716 only stores the most recent copy of the packet.

The second category of modules 704 are only implemented on end nodes, i.e., source and destinations nodes of a wireless network. Transfer module 710 is an example of such module. Transfer module 710 is responsible for performing numerous tasks such as managing connections, handling timeouts, implementing one or more congestion avoidance mechanism, and controlling feedback rates of packet retransmissions. The transfer module 710 further includes two sub-modules, a port manager 712 and a connection manager 714. The port manager 712 is configured to assign and register ports to applications in the application layer 610. For example, an application may send a request to the port manager 712 for a specific port assignment or let the port manager assign to it a free port. The connection manager 714 is configured to maintain a registry of all connections in addition to maintaining a registry for "listening" applications (i.e., applications configured to identify and accept new connection requests) and a separate registry for established connections. Statistics gathered by the transfer module 710 regarding each connection are also stored in the respective registries. The connection manager 714 further categorizes each entry in the registry of established connections into an incoming connection, an outgoing connection, or both, depending on whether the connection is unidirectional or bidirectional. The connection manager 714 is also responsible for properly terminating each connection when appropriate, regardless of whether the connection is terminated due to timeouts or at a request of an application when the transfer is complete. Following a termination, the connection manager 714 releases all pertinent buffers, cancels any set timers, and, in the case of a normal termination, ensures that the transfer is fully complete. Otherwise, the transfer module 710 informs the application of an abnormal termination.

In operation, for each received packet, the transfer module 710 stores information in the header of the packet in the connection registry of the connection manager 714 and uses the information to dynamically adjust feedback rates and transmission parameters so as to avoid congestion, achieve fairness and adapt to changes in network conditions. At a source node, the transfer module 710 has the additional responsibility of responding to retransmission requests made by a destination node. In particular, a transfer module 710 implemented at a source node ensures that all requested packets are retransmitted and such in-network recovery does not affect fair rate resource allocation in the network.

At each end node, a queuing module 717 is implemented for managing queues of packets associated with incoming and outgoing connections. Since buffer management is different at source and destination nodes, the queuing module 717 is able to adapt its functionality to the underlying node type. For example, to process incoming packets at a destination node, the queuing module 717 stores received packets in a queue until the packetization module 718 requests them. The queuing module 717 is also able to provide a list of missing packets to the packetization module 718, remove packets from the queue upon receiving a request from the packetization module 718, remove duplicated packets, and inform the transfer module 710 whenever the queue becomes full so that the transfer module 710 applies flow control to the source node. Furthermore, in the case that a missing packet is not essential for meeting QoS requirements, the queuing module 717 is able to "fake" the reception of packets when instructed to do so by the packetization module 718. Alternatively, to process outgoing packets from an application of a source node, the queuing module 717 stores the packets in two queues, a ready queue and a pending queue, where the ready queue is used to store packets that are ready to be sent and the pending queue is used to store packets that have been sent, but are not yet acknowledged by the destination node. Upon receiving packets from the packetization module 718 and the transfer module 710, the queuing module 717 is responsible for inserting the packets into the ready queue and the pending queue, respectively. In the case that the ready queue is full, the queuing module 717 notifies the packetization module 718 to stop sending packets and, in the case that the pending queue is full, the queue module 717 notifies the transfer module 710 to stop sending packets. The queuing module 717 is also adapted to remove from both queues packets whose receptions have been acknowledged by the destination node. In such case, the queuing module 717 moves all packets for which retransmission is requested to the head of the ready queue and move the packets that have been retransmitted by intermediate nodes to the pending queue.

Furthermore, at each end node, one or more packetization modules 718 are implemented to meet reliability demands of different applications or types of applications corresponding to each module. Each packetization module 718 is responsible for informing an application of a connection error as well as initiating, establishing and terminating a connection on behalf of the application. Similar to the queuing module 717, a packetization module 718 has varied functionalities depending on the underlying node type. At a source node, the packetization module 718 is responsible for receiving data frames from an application and transforming the data frames into valid data packets before sending them to the queuing module 717. The packetization module is also responsible for assigning a loss tolerance to each packet based on the QoS requirements of an application corresponding to the packet. At a destination node, the packetization module 718 is responsible for transforming data packets received from the queuing module 717 to application-level data frames and delivering the frames to the corresponding application. The packetization module 718 is also adapted to specify an energy budget for a packet, terminate a connection when requested by an application, and create a NACK portion of a feedback that is forwarded to the transfer module 710.

Figure 7B:
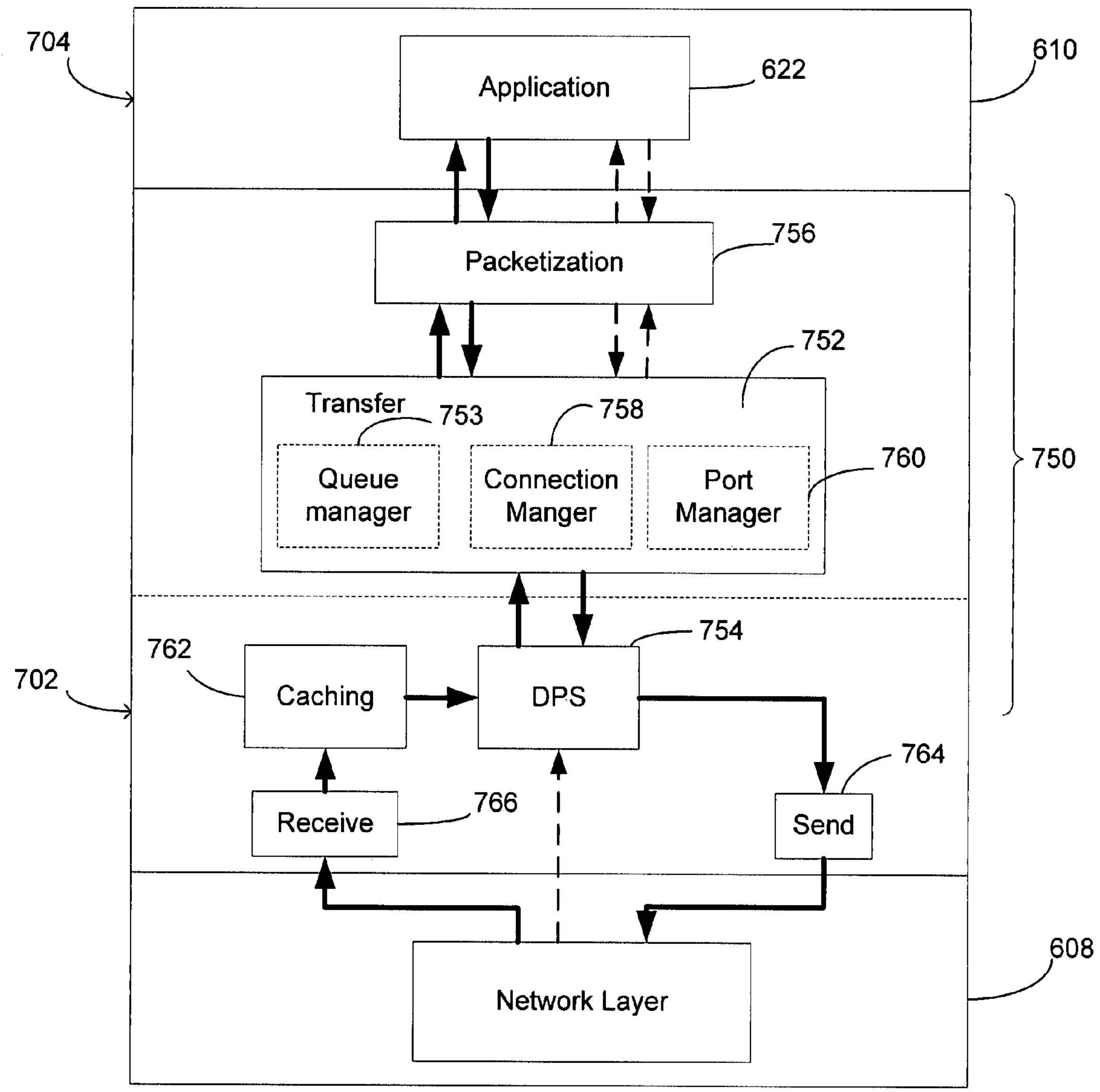
FIG. 7B is a block diagram of a second stack architecture according to another illustrative embodiment of the invention.

FIG. 7B provides an exemplary configuration of second implementation 750 of the JTP module 624 of transport layer 602 of FIG. 6. Like the JTP module configuration 700, the JTP module configuration 750 includes a number of functional modules generally divided into two categories, where the first category of modules 702 are implemented on all nodes of a wireless network and the second category of modules 704 are implemented only on end nodes, namely source and destination nodes of the network. In contrast to the first JTP module configuration 700, in the second configuration 750, the functionality of the queuing module 717 of the first implementation 700 is incorporated into the transfer module 752 of the second implementation as queuing manager 753. In addition, the JTP module configuration 750, unlike the configuration 700 includes a dynamic packet state (DPS) module 754. The DPS module 754 is responsible for updating the information stored in the headers of packets, such as the energy budget, loss tolerance, and deadline fields, based on data obtained from the network layer 608. Finally, in the second implementation, the JTP module configuration 750 forgoes independent forwarding and routing modules, relying on the native functionality of the network layer 608. The remaining modules, including the packetization module 756, the connection manager 758, the port manager 760, the caching module 762, the send module 764, and the receive module 766, carry out similar functions as their counterpart modules in the first implementation described above in relation to FIG. 7A.

In certain implementations, portions of the JTP modules 700 or 750 fitting into the first category of modules 702 are implemented at the link layer 606 in the stack architecture 600, for example in the DLL module 628, as opposed to at the transport layer 602. These portions, however, may maintain direct communication links with portions of the JTP modules 700 and 750 implemented at the transport layer.

The modules described above may be implemented as hardware circuits comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. The executable code may be stored on one or more computer readable media, such as magnetic disks, optical disks, holographic disks, or integrated circuit-based memory, such as flash memory.

Figure 8A:
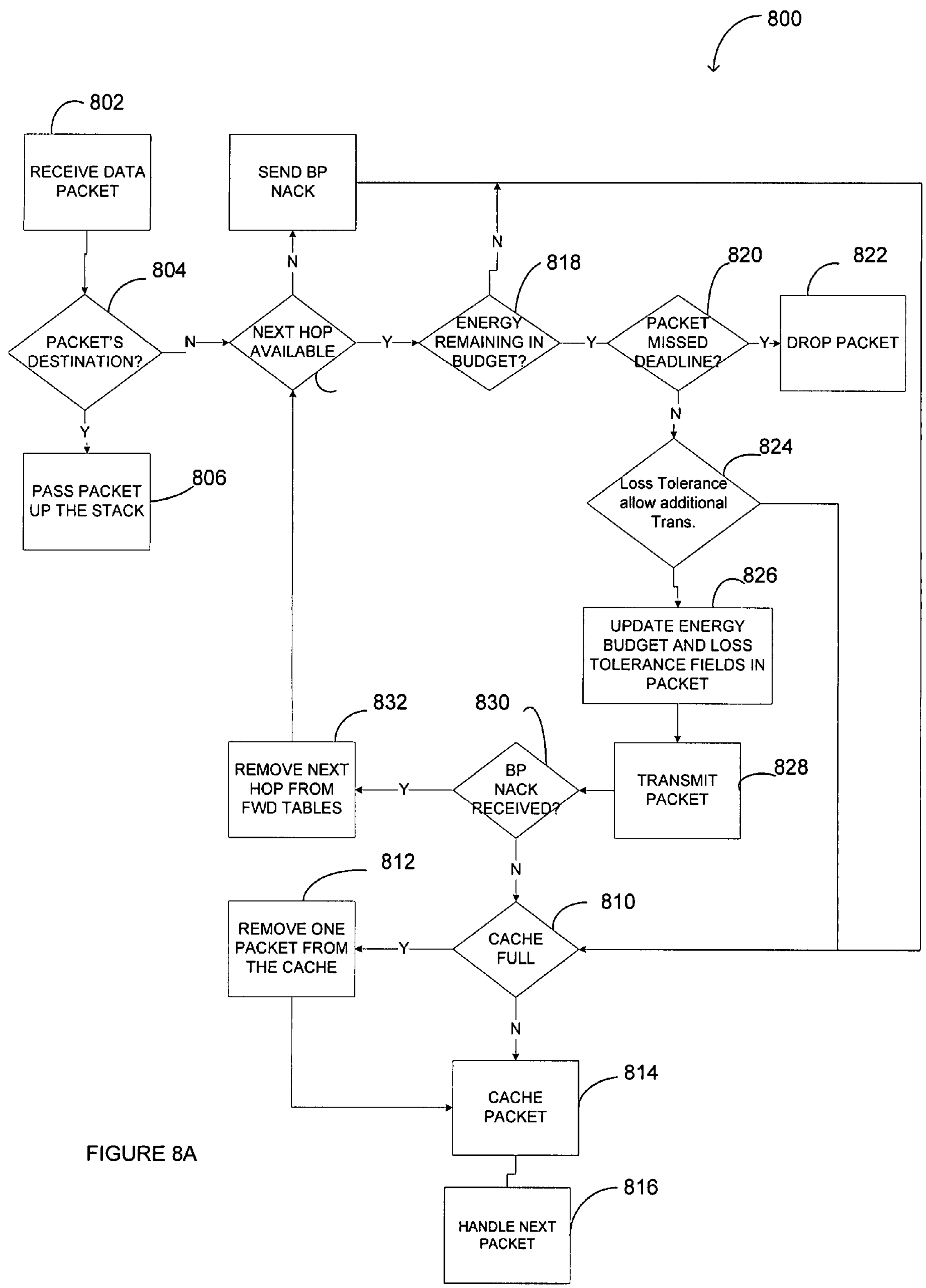
FIG. 8A is a flow diagram of a method of handling a packet according to an illustrative embodiment of the invention.

FIG. 8 is a flow diagram of a method 800 of processing a data packet, according to an illustrative embodiment of the invention. The method 800 begins with a node receiving a data packet (step 802). The receiving node analyzes the packet header to determine whether it is the intended destination for the packet (decision block 804). If the node is the destination, the node passes the packet up through the protocol stack, for example, as described above in relation to FIG. 6 (step 806). At this point, the destination node may optionally transmit an acknowledgement message indicating receipt of the packet. If a separate acknowledge message is sent, the acknowledgement message may include the entire path the packet traversed in reaching the destination node so that each intermediate node can remove the packet from its cache. In one implementation, the destination node may send a single acknowledgement message indicating the successful receipt of multiple packets to reduce network overhead. For example, such a message may be included in the periodic feedback messages sent by the destination node. The acknowledgement may indicate which packets were received, or alternatively, by indicating which packets were not received. The indication may be, for example, in the form of a bit vector.

If the node is not the destination node, but is a node on the path to the destination node, the node determines, using its forwarding table, whether a next hop node on the way to the destination node is within the radio range of the node (decision block 807). For example, while the node may originally have been on a path to the destination node, a subsequent intermediate node in the path may have moved out of radio range since the transmission of a previous packet. If no next hop is not available, the node transmits a NACK message back to the source (step 808) indicating that the prior path is no longer viable, referred to herein as a "bad path NACK" or "BP NACK". The node then stores the data packet in its cache (decision block 810, and steps 812 and 814). At decision block 810, the node determines whether its cache is full. If the cache is full, the node applies its cache replacement policy to remove a packet from the cache (step 812). After removing a packet (step 812), or if the cache determined to have room (at decision block 810), the received packet is stored in the cache (step 814), and the node begins processing the next packet (step 816).

If at decision block 807, the node determines that a next hop is available, the node proceeds to determine whether the packet has sufficient energy left in its budget to forward it (decision block 818). If forwarding the packet would result in energy budget of the packet, being exceeded, the method proceeds to decision block 810 to store the packet in the cache.

If, at decision block 810, the packet has sufficient energy left in its budget to be forwarded, the node checks the if the packet's deadline has passed (decision block 820). If the deadline has passed, the packet is dropped (step 822). Otherwise, the node determines whether the packet's loss tolerance parameter allows for its retransmission. If the packet has already been transmitted a maximum number of times at the link layer as determined by the packet's loss tolerance parameter (decision block 824).

Finally, if the packet has a next hop available (decision block 807), has sufficient energy left in its energy budget (decision block 818), has not passed its deadline (decision block 820), and has not already been retransmitted a maximum number of times as determined based on its loss tolerance requirements (decision block 824), the node will update the header of the packet to adjust its energy expended and loss tolerance data fields (step 826), and the node will transmit the packet to its next hop (step 828). Unless the node later receives a BP NACK indicating the packet was not received because of path failure, the node places the packet in its cache beginning with decision block (810). If the node receives a BP NACK, the next hop node is removed from the node's forwarding table (step 832) and the method returns to step 806 to determine whether the packet should be retransmitted.

Figure 8B:
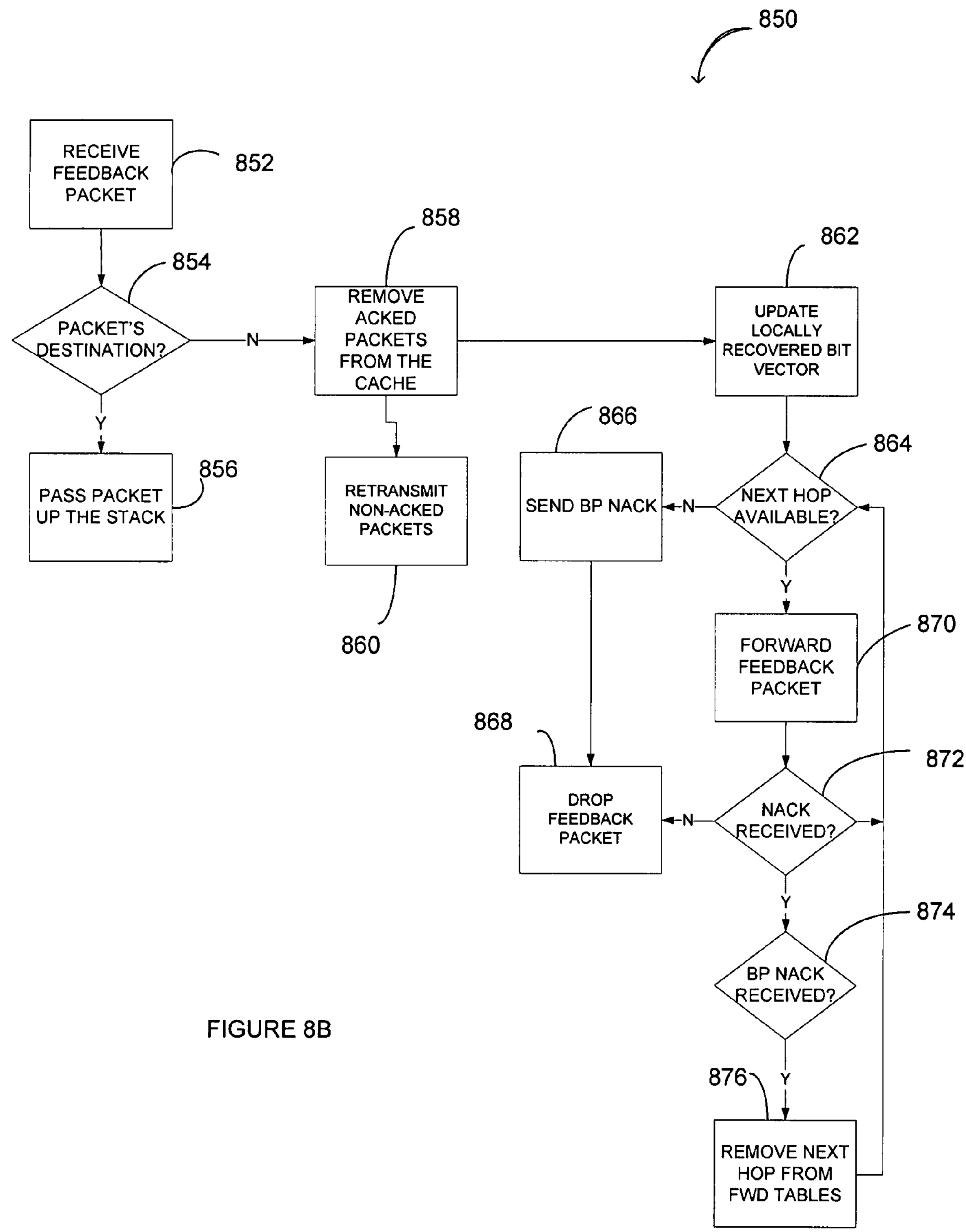
FIG. 8B is a flow diagram of a method of handling a feedback packet according to an illustrative embodiment of the invention.

FIG. 8B is a flow chart of a method 850 of a node handling a feedback packet, according to an illustrative embodiment of the invention. The node handles feedback packets, i.e., packets transmitted by destination nodes that include path characteristic information back to source nodes, along with acknowledgements or NACK information, according to a separate process flow than used to handle data packets (i.e., method 800).

The method 850 begins with the node receiving a feedback packet (step 852). If the receiving node is determined to be the destination of the feedback packet, i.e., the source of messages for which path feedback is being provided, at decision block 854, the packet is passed up the stack (step 856). Otherwise, the packet is analyzed to extract packet acknowledgement information. The acknowledgement information may be in the form of a bit vector identifying received packets, or a bit vector identifying packets for which retransmission is requested. In the former case, the node assumes that the destination node (i.e., the source of the feedback packet) is requesting retransmission of all packets not identified in the bit vector. In the latter case, the node assumes the destination node successfully received all packets not identified in the bit vector. In either case, successfully received packets, whether specifically identified or assumed based on omission in a retransmission, are removed from the node's cache (step 858). All packets for which retransmission is explicitly or implicitly requested are then slated for retransmission according to method 800, beginning at decision block 807.

The feedback packet, in addition to explicitly or implicitly identifying packets for which retransmission is requested, includes a list, referred to as the recovered bit vector, of which of such identified packets have been retransmitted by nodes along the path back from the destination node to the source node. The node processing the feedback packet, updates the recovered bit vector in the feedback packet based on which requested packets remain in its cache and are capable of retransmission in accordance with the cached packets' energy budgets, deadline, and loss tolerance parameters (step 862).

After the recovered bit vector is updated (step 862), the node determines whether a next hop node is available for the feedback packet (decision block 864). If no next hop node is available, the node sends a BP NACK back to the destination node (i.e., feedback packet source) (step 866) and drops the feedback packet (step 868). If a next hop node available, the node transmits the feedback packet to that node (step 870).

After the feedback packet is forwarded (step 870), the node waits for a NACK message. If no NACK is received (decision block 872), the node drops the feedback packet (step 868) assuming its transmission was successful. If a NACK is received (decision block 872), the NACK is analyzed to determine its type. If the NACK is a BP NACK, the next hop node is removed from the forwarding table (step 876), and the node determines whether another next hop node is available by returning to decision block 864. If the NACK merely indicates the feedback packet was not successfully received, for example, it was corrupted during transmission, the method 850 returns directly to step 864.

The invention may be embodied in other specific forms without departing from the spirit or essential characteristics thereof. The forgoing embodiments are therefore to be considered in all respects illustrative, rather than limiting of the invention.

What is claimed is:

1. A transport protocol of an ad-hoc network, comprising:

at least one module implemented on intermediate nodes of the network configured to:

forward received packets having a per-node loss tolerance, limit retransmissions of the received packets failing to reach their destination according to the per-node loss tolerance of the respective packets, and update forwarded packets to reflect an amount of energy expended by the respective intermediate node in forwarding the respective packets; and at least one module implemented on end nodes of the network configured to: set per-node loss tolerances for transmitted packets based on reliability requirements of an application associated with the respective transmitted packets, and transmit path characteristic messages to other end nodes of the network indicating characteristics of paths through the network derived from data obtained from headers of packets received from the respective other end nodes.

2. The transport protocol of claim 1, wherein the path characteristic messages include a transmission sending rate for another node to use in transmitting packets to the end node transmitting the path characteristic message based on availability data aggregated in headers of packets received by the end node.

3. The transport protocol of claim 1, wherein the at least one module implemented on intermediate nodes is configured to limit retransmissions of the received packets failing to reach their destination according to per-packet energy budgets of the respective packets.

4. The transport protocol of claim 1, wherein the at least one module implemented on intermediate nodes is configured to update per-node loss tolerances of respective packets.

5. The transport protocol of claim 1, wherein the at least one module implemented on end nodes of the network is configured to set the per-node loss tolerances of respective packets based on reliability requirements of applications associated with respective packets.

6. The transport protocol of claim 1, wherein the at least one module implemented on intermediate nodes is configured to cache a received packet until receipt of the packet by a destination nodes is acknowledged, the energy budget for the packet is expended, or a cache replacement policy implemented on the intermediate node requires the packets deletion from the cache to make room for other received packets.

* * * * *